(12) United States Patent
Chisholm et al.

(10) Patent No.: US 12,291,140 B1
(45) Date of Patent: May 6, 2025

(54) VEHICLE FRONT END ASSEMBLY

(71) Applicants: NISSAN NORTH AMERICA, INC., Franklin, TN (US); NISSAN MOTOR CO., LTD., Yokohama (JP)

(72) Inventors: Bradley Chisholm, Commerce Township, MI (US); Erin Maroney, Orchard Lake, MI (US); Gary Eberhard, Oxford, MI (US); Manabu Ootani, Machida (JP)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 18/615,467

(22) Filed: Mar. 25, 2024

(51) Int. Cl.
- *B60Q 1/00* (2006.01)
- *B60Q 1/04* (2006.01)
- *B62D 25/08* (2006.01)

(52) U.S. Cl.
CPC ........... *B60Q 1/0408* (2013.01); *B62D 25/08* (2013.01)

(58) Field of Classification Search
CPC ............................. B62D 25/08; B60Q 1/0408
See application file for complete search history.

(56) References Cited

U.S. PATENT DOCUMENTS

| 7,273,246 | B2 |   | 9/2007  | Wada |   |
|---|---|---|---|---|---|
| 7,644,966 | B2 |   | 1/2010  | Huber et al. |   |
| 7,841,651 | B2 | * | 11/2010 | Crainic | B60R 19/50 |
|   |   |   |   |   | 296/193.09 |
| 8,414,069 | B1 | * | 4/2013  | Contardi | B60Q 1/0433 |
|   |   |   |   |   | 293/120 |
| 8,517,461 | B2 |   | 8/2013  | Huber |   |
| 2021/0023936 | A1 | * | 1/2021  | Marietta | B60K 13/02 |
| 2022/0388444 | A1 | * | 12/2022 | Anghel | H05B 45/40 |

* cited by examiner

*Primary Examiner* — Gerald J Sufleta, II
(74) *Attorney, Agent, or Firm* — Global IP Counselors, LLP

(57) ABSTRACT

A vehicle front end assembly includes a front fascia a first lamp assembly, a second lamp assembly and a first support. The front fascia is configured to be attached to a front portion of a vehicle frame structure. The first lamp assembly is attached to the front fascia. The second lamp assembly is configured to be attached to the portion of a vehicle frame structure. The first support includes a vehicle attachment portion and a first lamp attachment portion. The vehicle attachment portion is configured to be attached to the front portion of the vehicle frame structure. The first lamp attachment portion is attached to the first lamp assembly. The first support supports the first lamp assembly to the front portion of the vehicle frame structure in an installed state where the vehicle front end assembly is attached to the vehicle frame structure.

23 Claims, 23 Drawing Sheets

VEHICLE FRONT END ASSEMBLY

BACKGROUND

Technical Field

The present disclosure generally relates to a vehicle front end assembly. More specifically, the present disclosure relates to attachments between elements of a front end assembly.

Background Information

The first lamp assembly at the front end of vehicles serves many purposes including providing an attractive appearance to the front of a vehicle, providing light to the external environment and providing attachments that support for the weight of first lamp assembly and the front fascia.

SUMMARY

Generally, the present disclosure is directed to various features of a vehicle front end assembly.

It has been discovered that in order to better support the front end assembly, a new attachment strategy could be used to attach the front fascia to the front portion of the vehicle frame structure.

In view of the state of the known technology, one aspect of the present disclosure is to provided a vehicle front end assembly includes a front fascia, a first lamp assembly, a second lamp assembly and a first support. The front fascia is configured to be attached to a front portion of a vehicle frame structure. The first lamp assembly is attached to the front fascia. The second lamp assembly is configured to be attached to the portion of a vehicle frame structure. The first support includes a vehicle attachment portion configured to be attached to the front portion of a vehicle frame structure and a first lamp attachment portion attached to the first lamp assembly. The first support supports the first lamp assembly to the front portion of a vehicle frame structure in an installed state where the vehicle front end assembly is attached to the front portion of a vehicle frame structure.

Also, other objects, features, aspects and advantages of the disclosed vehicle front end assembly will become apparent to those skilled in the art from the following detailed description, which, taken in conjunction with the annexed drawings, discloses preferred embodiments of the vehicle front end assembly.

BRIEF DESCRIPTION OF THE DRAWINGS

Referring now to the attached drawings which form a part of this original disclosure, an illustrative embodiment is shown.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
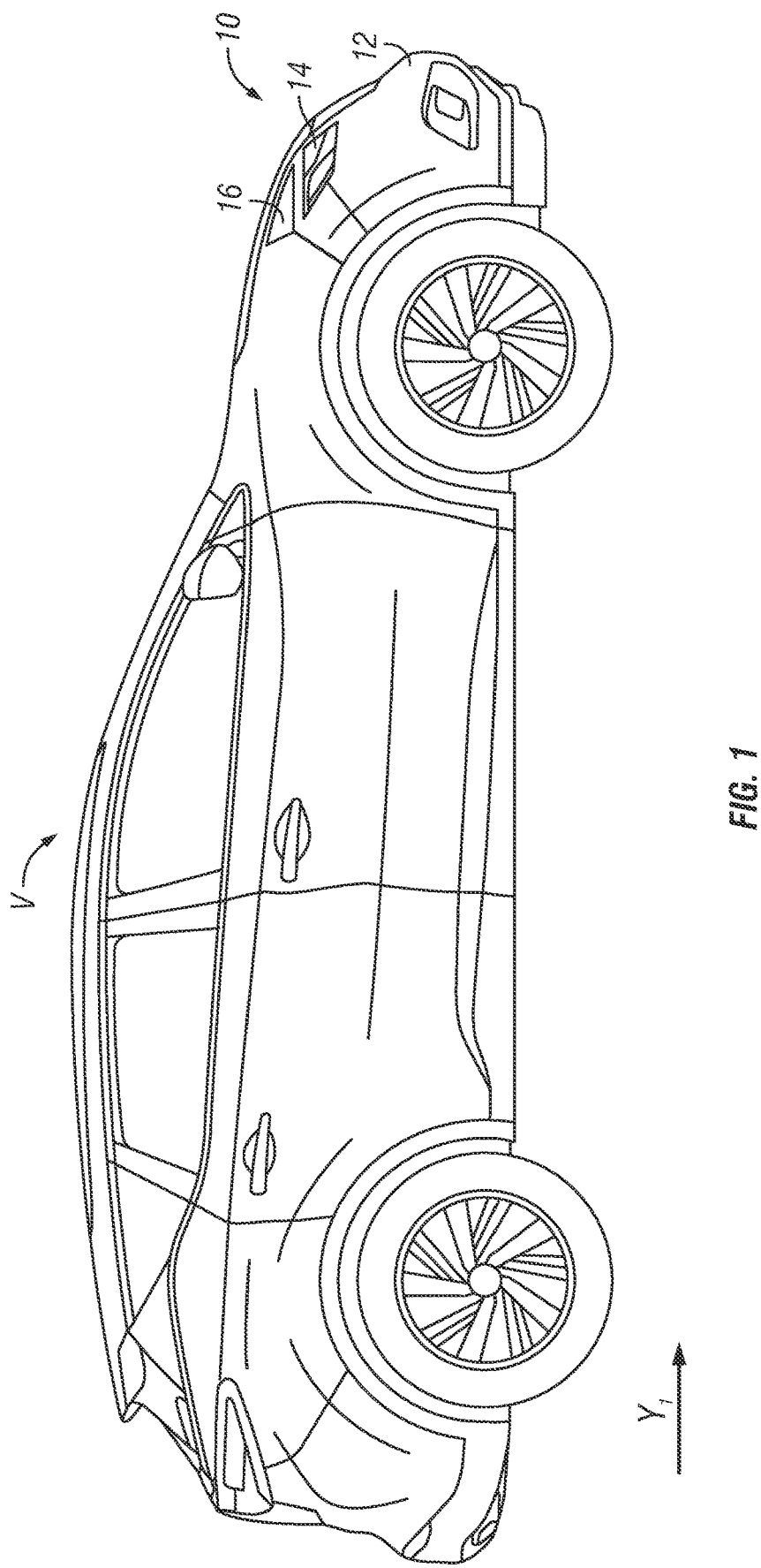
FIG. 1 is a side elevational view of a vehicle having a front end assembly in accordance with a first embodiment.
Figure 2:
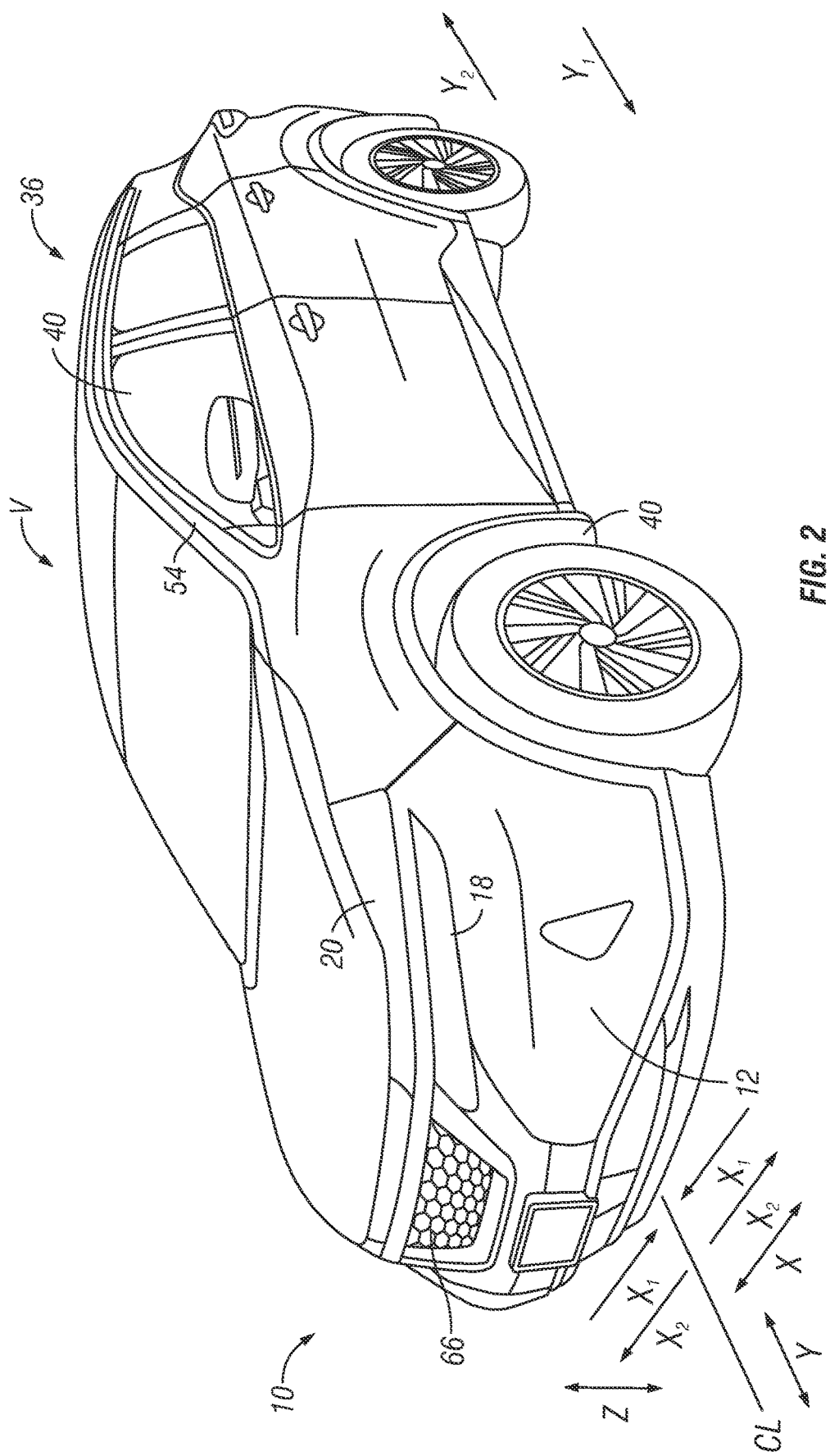
FIG. 2 is a perspective view of the vehicle having the front end assembly in accordance with the first embodiment.

Referring initially to FIGS. 1 and 2, a vehicle V is illustrated that includes a front end assembly 10 in accordance with a first embodiment. The front end assembly 10 includes, among other component and features, a front fascia 12, a first lamp assembly 14 and a second lamp assembly 16. More specifically, in the first embodiment, the front end assembly 10 further includes a third lamp assembly 18 and a fourth lamp assembly 20.

Referring now to FIGS. 3 to 6, the front end assembly 10 is attached to a vehicle frame structure 22 of the vehicle V. In particular, the front end assembly 10 is attached to a front portion 24 of the vehicle frame structure 22. The front end assembly 10 further includes a first support 26 that is attached between the front portion 24 of the vehicle frame structure 22 and the first lamp assembly 14. The front end assembly 10 further includes an additional first support 26 that is attached between the front portion 24 of the vehicle frame structure 22 and the third lamp assembly 18.

The front portion 24 of the vehicle frame structure 22 includes, among other features, the front side member 30, a fender support structure 32 and a radiator support structure 34. In particular, the front end assembly 10 is attached to the fender support structure 32 and the radiator support structure 34 of the front portion of the vehicle frame structure 22.

Basically, the vehicle V has a lateral direction X, a lengthwise direction Y and a vertical direction Z. The lateral direction X includes an inboard direction X1 and an outboard direction X2. The inboard direction X1 and the outboard direction X2 are defined relative to a centerline CL of the vehicle V that extends parallel to the lengthwise direction Y of the vehicle V. The lengthwise direction Y includes a forward direction Y1 and the rearward direction Y2 that are also parallel to the centerline CL of the vehicle V. The vertical direction Z is perpendicular to both the lateral direction X and the lengthwise direction Y.

A more detailed description of the front portion 24 of the vehicle frame structure 22 is now provided with specific reference to FIGS. 3-6.

The vehicle frame structure 22 is part of the vehicle body structure 36, portions of which are depicted in FIGS. 3-6. The vehicle body structure 36 can be a frame/chassis design or can be part of a unibody vehicle body design. In a frame/chassis design, the frame structure 22 includes beams and cross-members that are welded together to define a support structure with the structures of the passenger compartment 40 (see FIG. 2) being fixed thereto by, for example, mechanical fasteners. In a unibody design, the elements that define the passenger compartment 40 also serve as structural elements such that a conventional frame structure is not necessary. Rather, frame elements, such as the front side members 30 can extend from and optionally under predetermined sections of the passenger compartment 40 and are welded thereto.

In the depicted embodiment, the vehicle body structure 36 is a unibody vehicle design. Consequently, the front side members 30 extend forward from the passenger compartment 40 providing support for an engine and a transmission (not shown), the fenders 44, the first lamp assembly 14, the second lamp assembly 16, and the front fascia 12, along with numerous other elements and components such as those associated with the engine, air conditioning system and other conventional vehicle accessories.

The front end assembly 10 has a first lateral side and a second lateral side. The first lateral side of the front end assembly 10 includes a first lateral side of the front fascia 12, the first lamp assembly 14 and the second lamp assembly 16. The second lateral side of the front end assembly 10 includes a second lateral side of the front fascia 12, the third lamp assembly 18 and the fourth lamp assembly 20. The first lamp assembly 14 is attached to the front fascia 12 and is configured to be attached to the front portion 24 of the vehicle frame structure 22. The second lamp assembly 16 is configured to be attached to the front portion 24 of the vehicle frame structure 22. Similarly, the third lamp assembly 18 is attached to the front fascia 12 and is configured to be attached to the front portion 24 of the vehicle frame structure 22. The fourth lamp assembly 20 is configured to be attached to the front portion 24 of the vehicle frame structure 22. Since, the first lamp assembly 14 and the third lamp assembly 18 are identical except that they are mirror images of one another, the description of the first lamp assembly 14 applies equally to the third lamp assembly 18. Also, since the second lamp assembly 16 and the fourth lamp assembly 20 are identical except that they are mirror images of one another, the description of the second lamp assembly 16 applies equally to the fourth lamp assembly 20.

Similarly, the front fascia 12 has a first lateral side and a second lateral side that are symmetrical mirror images of one another. Since the two lateral sides of the front fascia 12 are basically the same (mirror images of one another), description of one side applies equally to the opposite side. Hence, only one side of the front end assembly 10 (and of the vehicle V) is described hereinbelow for the sake of brevity.

The front portion 24 of the vehicle frame structure 22 includes, among other features, the front side member 30, a fender support structure 32 and a radiator support structure 34. In the vehicle V, there are pair of front side members 30. The front side members 30 are frame elements that extend forward from the passenger compartment 40. Only one of the front side members 30 is described herein below for the sake of brevity. However, it should be understood from the drawings and the description herein that there are two front side members 30 that are identical to one another, except that they are symmetrical mirror images of one other. One of the front side members 30 is located on the driver's side of the vehicle V and the other front side member 30 is located on the passenger's side of the vehicle V. The two front side members 30 are approximately parallel to one another except for various curves and contours formed thereon.

Figure 3:
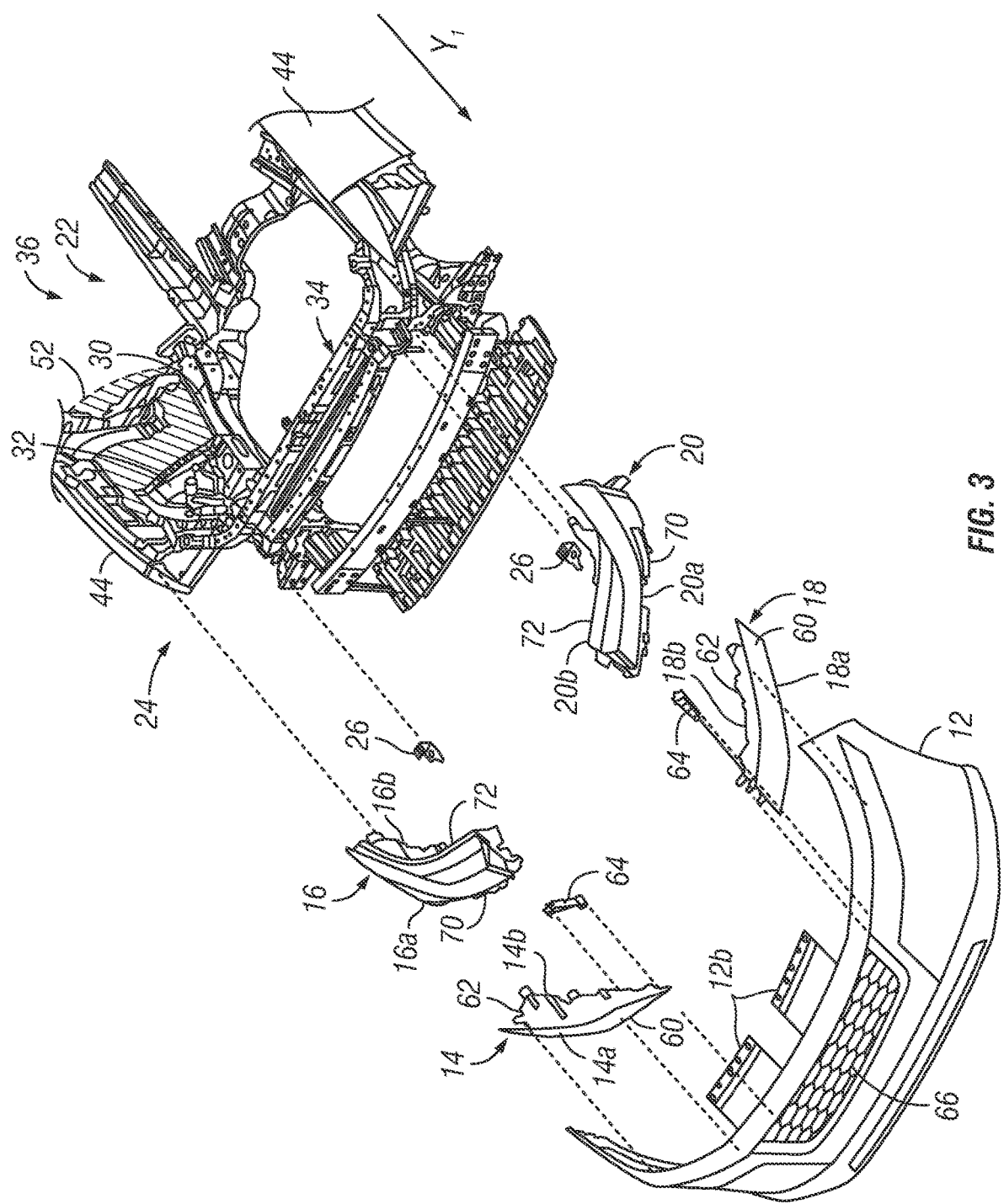
FIG. 3 is an exploded perspective view of the front end assembly showing a first lamp assembly, a second lamp assembly, a front fascia, a first support and a first lamp support in accordance with the first embodiment.
Figure 4:
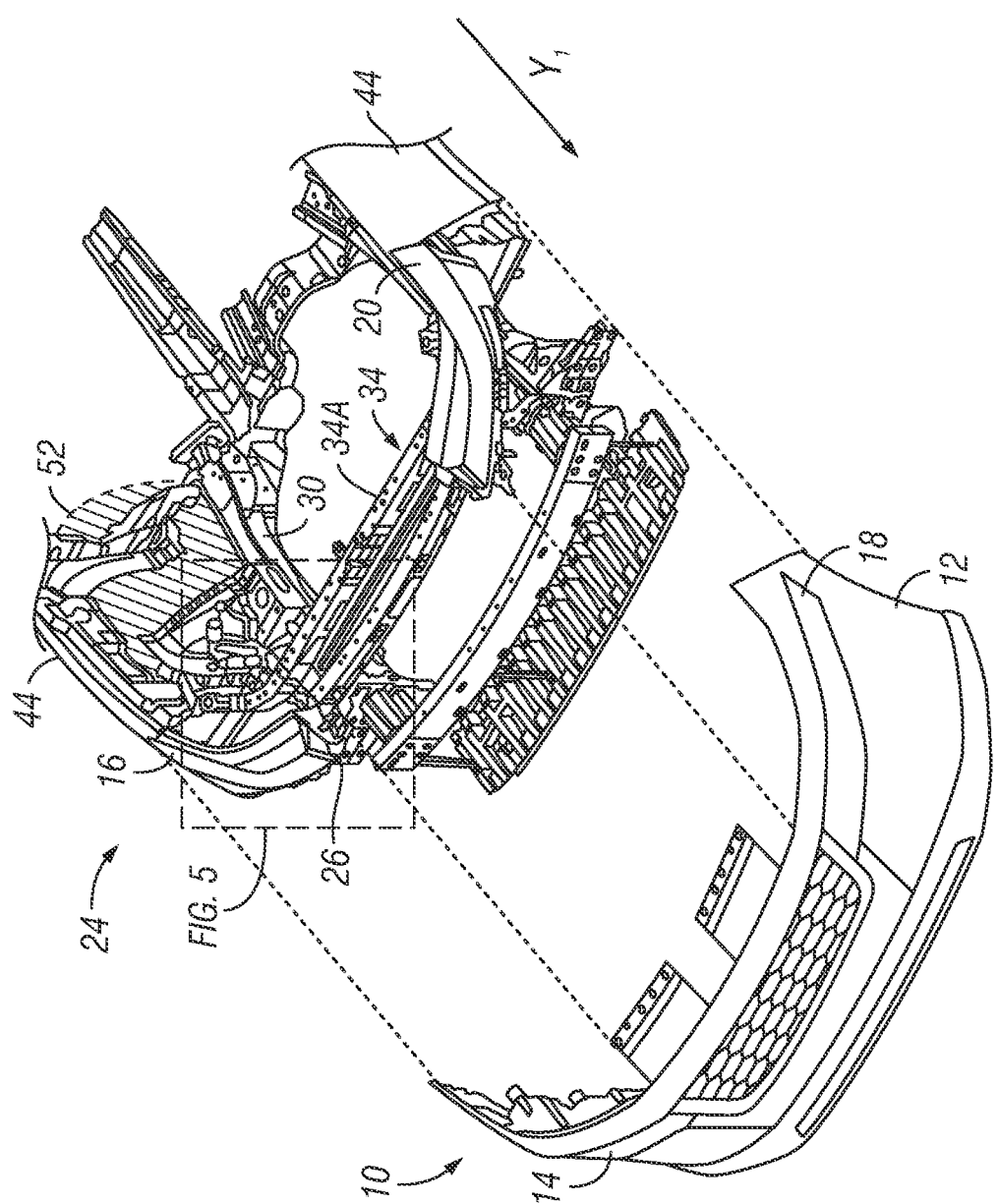
FIG. 4 is an exploded perspective view of the front fascia in a partly assembled state and the front portion of a vehicle frame structure in a partly assembled state before the front fascia is installed to the front portion of a vehicle frame structure in accordance with the first embodiment.

Referring to FIGS. 3-4, the fender support structure 32 includes structural elements 50 and structural elements 52. The structural element 50 extend downward from the A-pillar 54 and outboard from the front side member 30. The structural element 52 extends forward from the passenger compartment 40 above the front side member 30 (see FIGS. 3-4).

Referring to FIGS. 3-6, the radiator support structure 34 is a laterally oriented structure at a forward end of the front portion 24 that is shaped and configured to support a radiator (not shown) of the vehicle V. The radiator support structure 34 includes, among other structures, a first upper panel 34A, a second upper panel 34B, a second support 34C and a support bracket 34D. The first upper panel 34A extends approximately perpendicular to the lengthwise direction Y of the vehicle V. The first upper panel 34A is connected to an upper area of a front end of the front side member 30 via the support bracket 34D (see FIG. 5). More specifically, the first upper panel 34A is fixedly attached to the support bracket 34D via, for example, mechanical fasteners or welding techniques. In addition, the second upper panel 34B is attached via the second support 34C to the first upper panel 34A and the support bracket 34D. Stated differently, the second support 34C is attached to the first upper panel 34A and the first lamp assembly 14 (see FIG. 17). More specifically, the second upper panel 34B is fixedly attached to the second support 34C via, for example, mechanical fasteners or welding techniques.

The fender 44 is part of the vehicle body structure 36, which is depicted in FIGS. 1-4. The fender 44 is attached to at least the structural elements 50 and the structural element 52 of the vehicle body structure 36 (see FIG. 4), as well as other elements described further below. The fender 44 can include various shaped and contours surface portions but otherwise is a conventional vehicle component. Hence, further description is omitted for the sake of brevity.

A more detailed description of the components of the front end assembly 10 of the vehicle V is now provided with specific reference to FIGS. 3-11.

Figure 5:
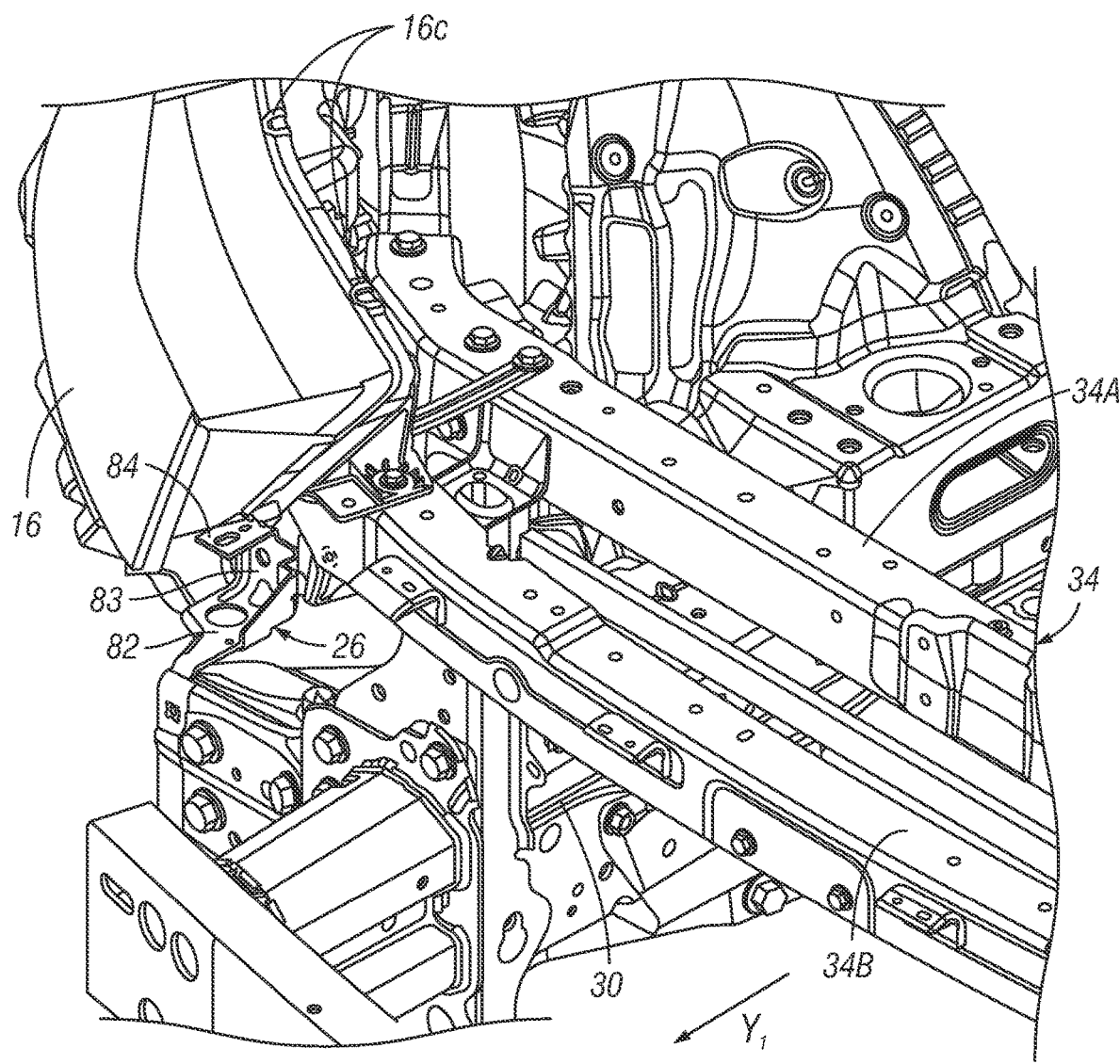
FIG. 5 is an enlarged perspective view of selected parts of the front end assembly showing the first support and the front portion of a vehicle frame structure before the front fascia is installed to the front portion of a vehicle frame structure in accordance with the first embodiment.
Figure 6:
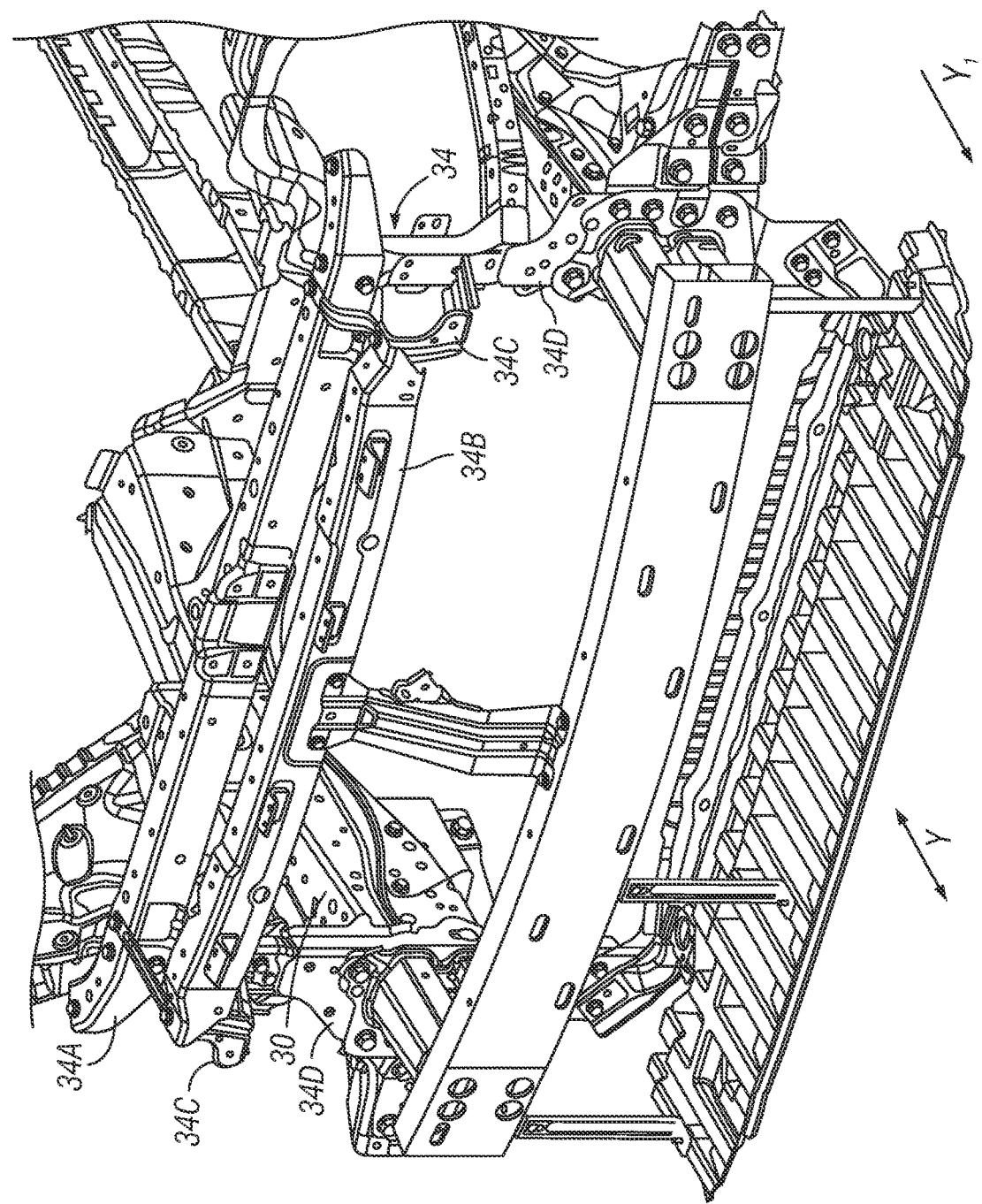
FIG. 6 is a perspective view of a front portion of a vehicle frame structure with the front fascia removed from the vehicle showing the front side member and the radiator support structure in accordance with the first embodiment.
Figure 7:
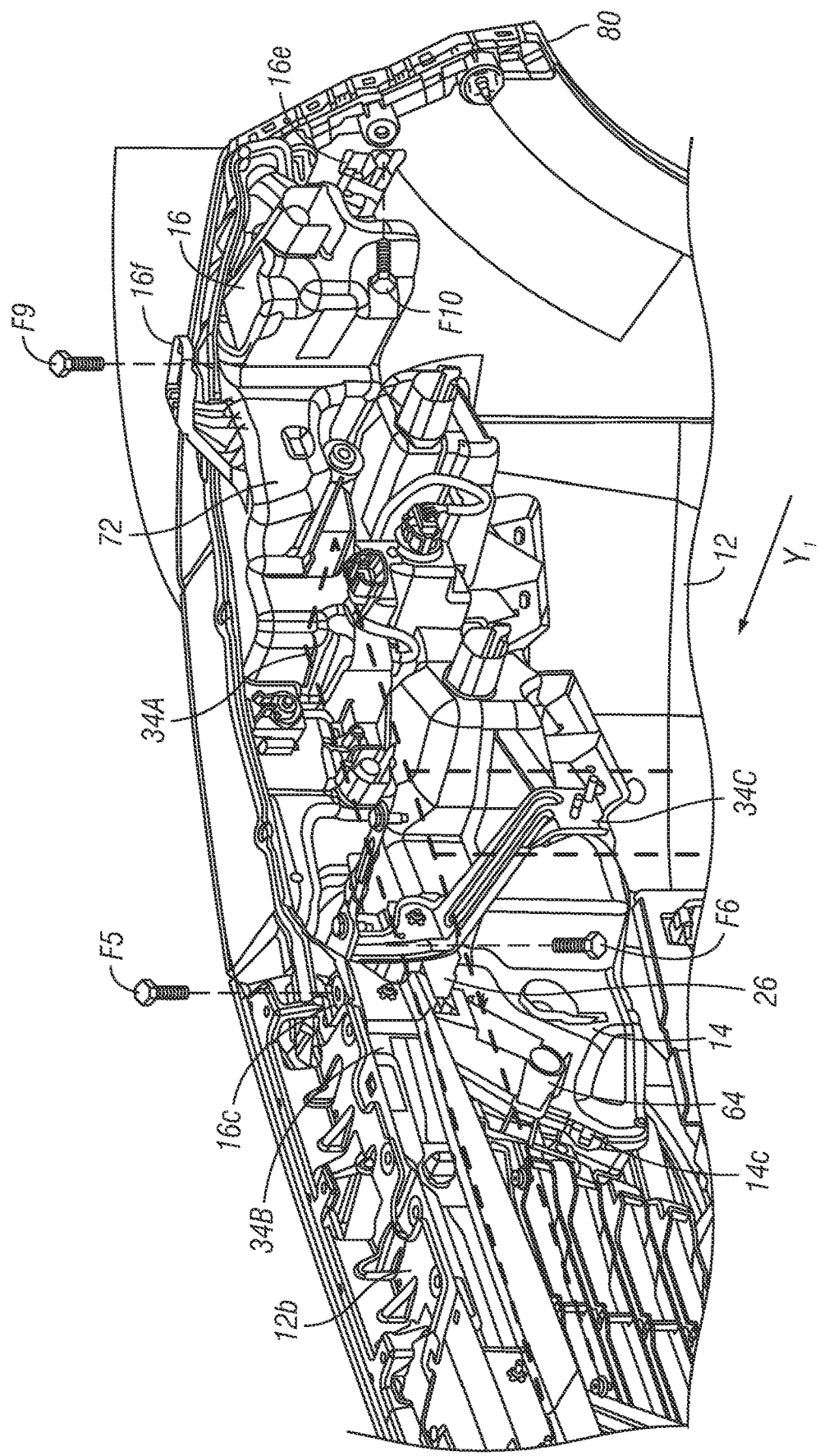
FIG. 7 is a partial rear perspective view of the front and side portions of the front end assembly removed from the vehicle showing the first lamp assembly, the second lamp assembly, the front fascia, the first lamp support and a first support in accordance with the first embodiment.
Figure 8:
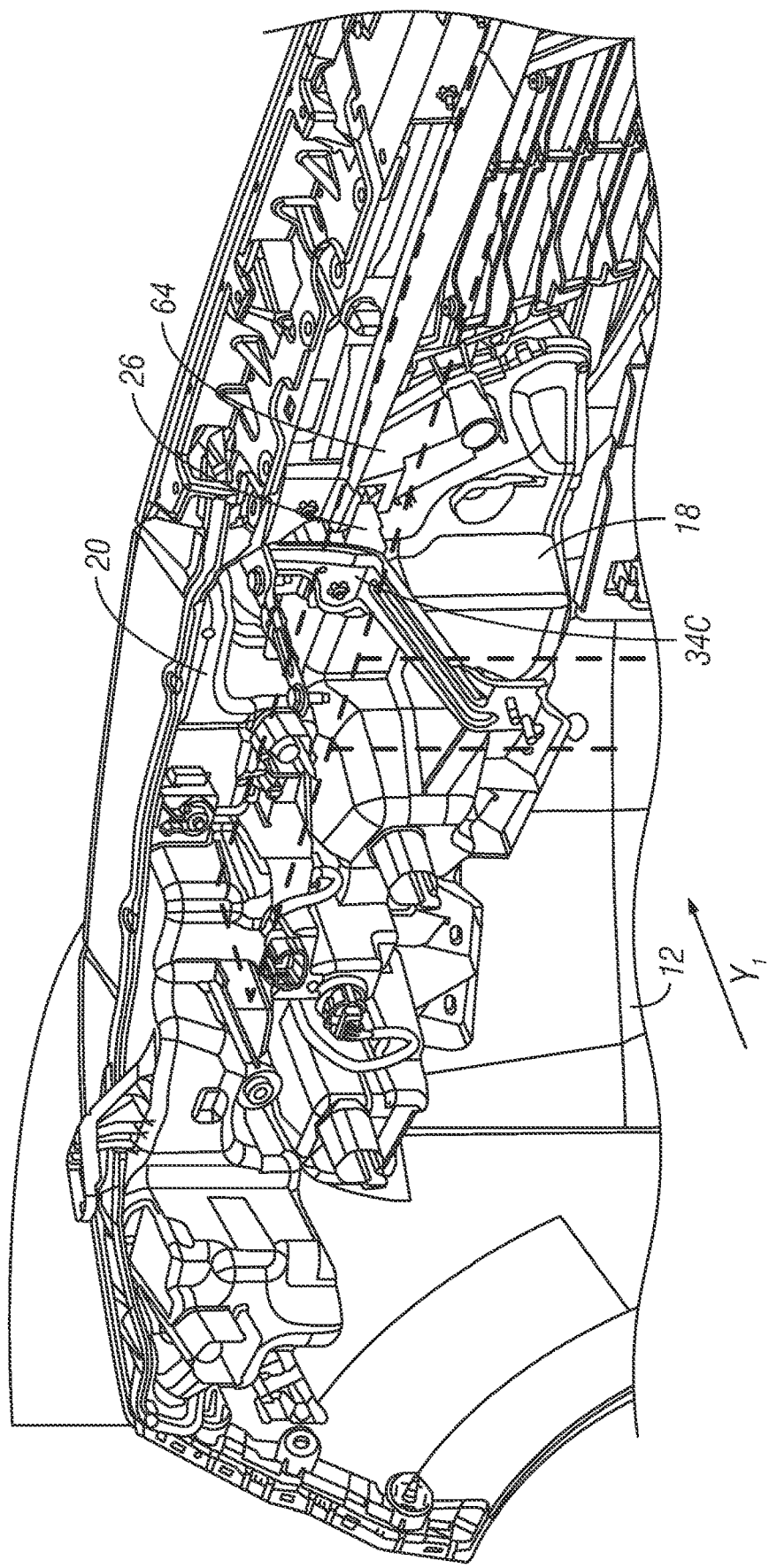
FIG. 8 is a rear perspective view of the opposite side of the vehicle with the front and side portions of the front end assembly removed from the vehicle showing the first lamp assembly, the second lamp assembly, the front fascia, the first lamp support and a first support in accordance with the first embodiment.
Figure 10:
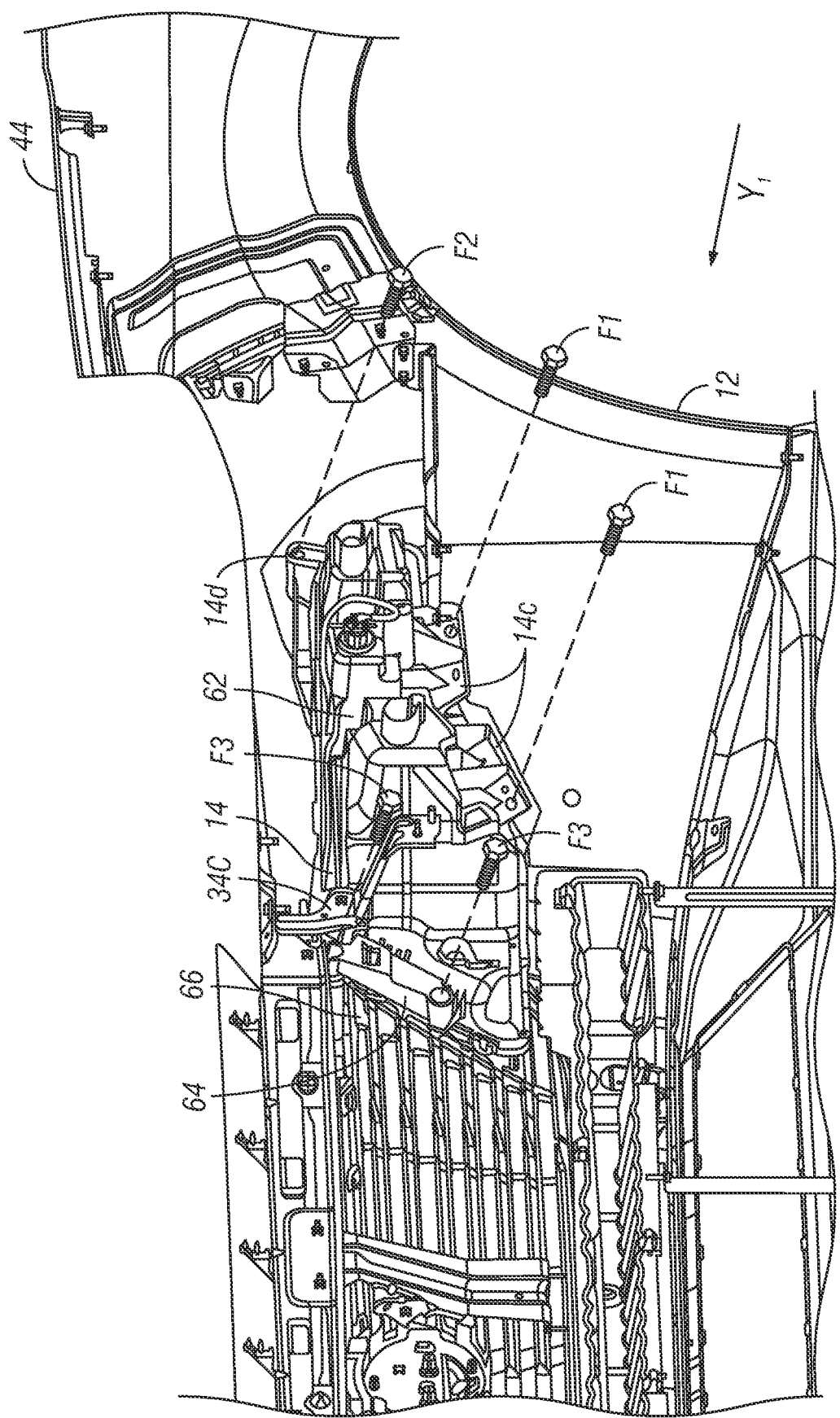
FIG. 10 is a rear perspective view of the front and side portions of the front end assembly removed from the vehicle showing the first lamp assembly attachments to the grill and the fascia in accordance with the first embodiment.

Referring to FIG. 3, the first lamp assembly 14 includes a first lens 60, a first housing 62 (also referred to as a first lamp assembly housing 62) and a first lamp support 64. The first lens 60 defines a forward facing surface 14a of the first lamp assembly 14 and the first housing 62 defines a rearward facing surface 14b of the first lamp assembly 14. The first lens 60 is a transparent element that transmits light produced from light producing elements (not shown) within the first housing 62. The first housing 62 defines a partially hollow interior with lighting elements installed therein. Referring to FIGS. 5, 7 and 10, the first lens 60 is attached to the first housing 62 by any of a variety of attachment designs, such as adhesive material(s) and/or a plurality of fastener elements such as a plurality of snap fitting projections 14c (see FIG. 7). The first lamp assembly 14 includes at least one of a daytime running lamp, a park lamp, a turn signal lamp and a fog lamp. In addition, referring to FIGS. 17 and 26, the first lamp assembly 14 includes a first lamp support 64 having a first end 64a and a second end 64b (see FIG. 26).

Referring to FIGS. 9-11 and 17, the first housing 62 of the first lamp assembly 14 includes a plurality of attachment points in order to install the first lamp assembly 14 to the front fascia 12 (see FIGS. 10-11), and the front portion 24 of the vehicle frame structure 22 (see FIG. 17), as described below.

Figure 9:
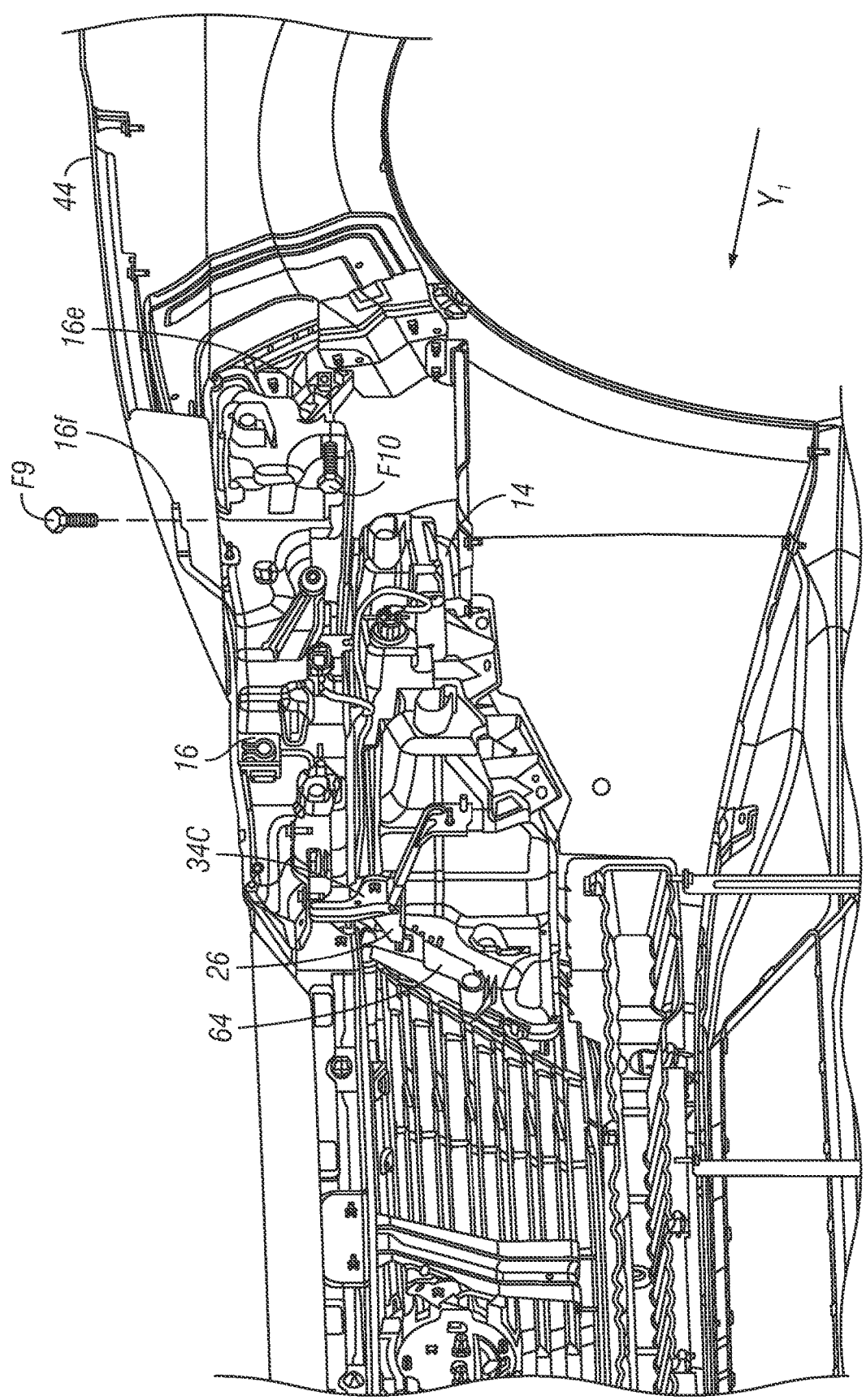
FIG. 9 is a rear perspective view of the front and side portions of the front end assembly removed from the vehicle showing the second lamp assembly attachments to the fender in accordance with the first embodiment.
Figure 11:
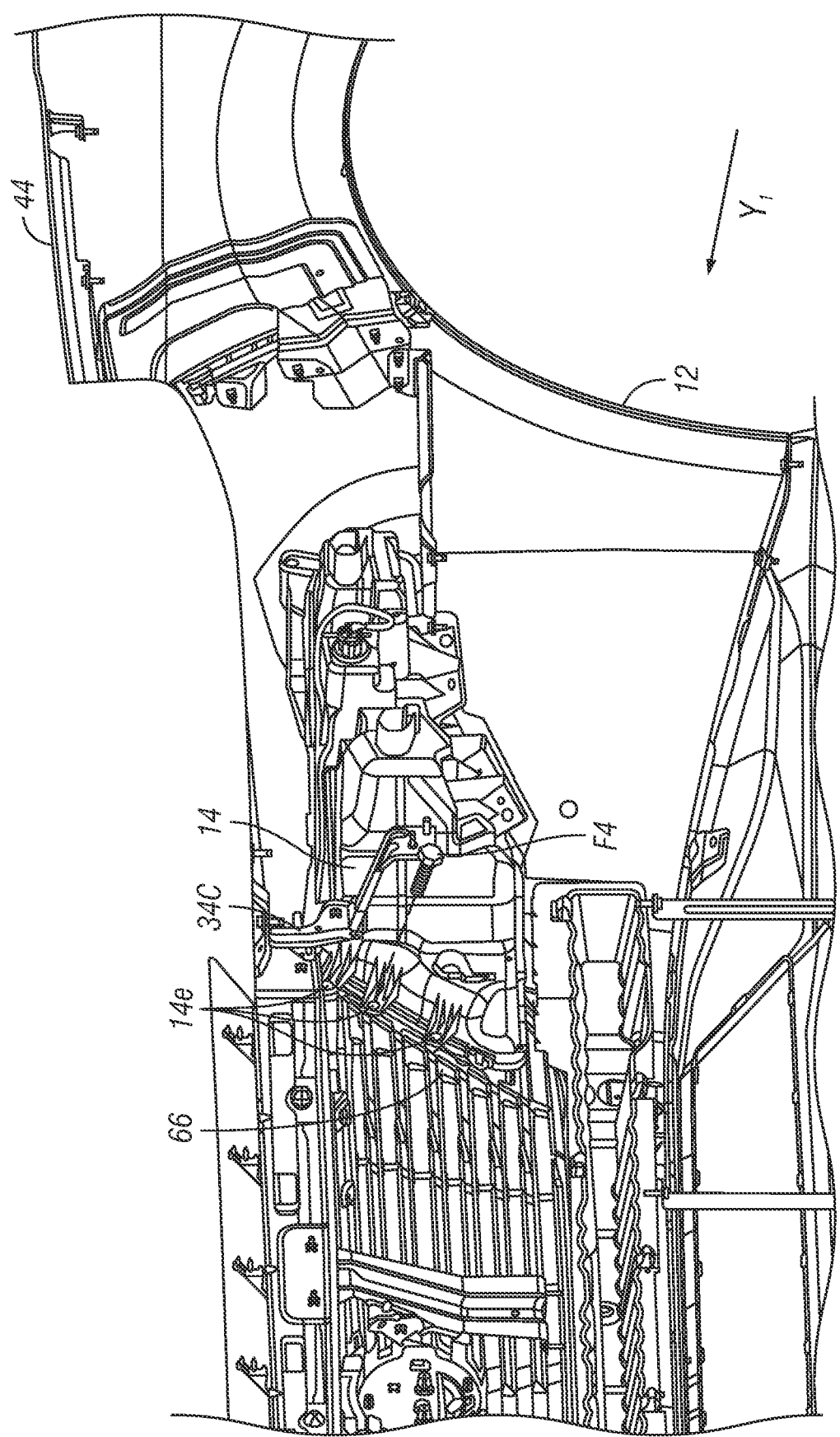
FIG. 11 is a rear perspective view of the front and side portions of the front end assembly removed from the vehicle showing the first lamp assembly attachments to the grill and the fascia with the first lamp support removed in accordance with the first embodiment.
Figure 12:
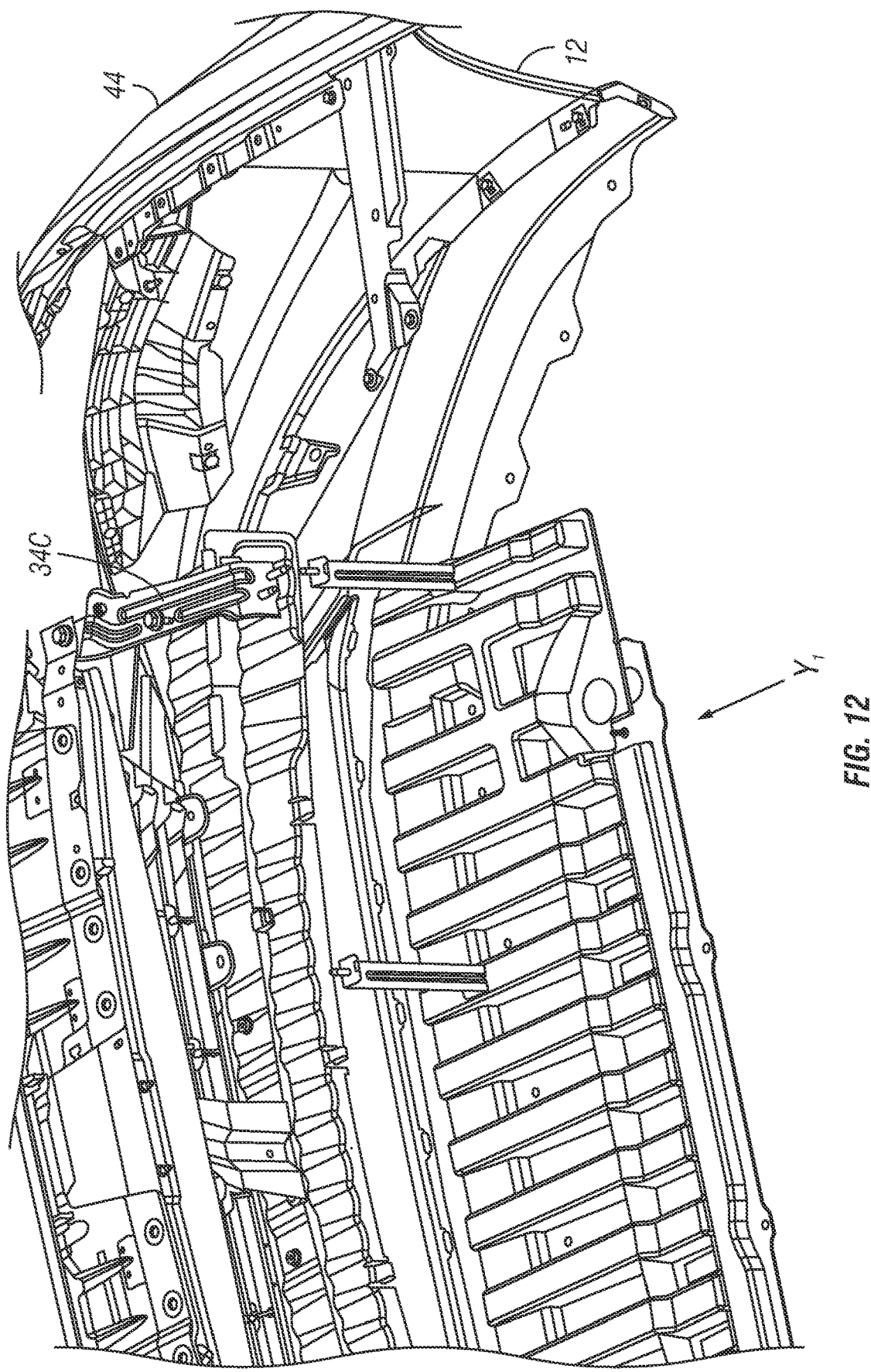
FIG. 12 is a rear perspective view of the front and side portions of the front end assembly removed from the vehicle showing the apron attached to the fascia in accordance with the first embodiment.

Referring to FIGS. 9-11, the first housing 62 (see FIG. 10) of the first lamp assembly 14 includes a pair of downwardly extending flanges 14c (see FIG. 10) and an upwardly extending flange 14d. The downwardly extending flanges 14c are connected to the front fascia 12 of the vehicle V by a pair of first fasteners F1. The upwardly extending flange 14d is connected to the front fascia 12 of the vehicle V by a second fastener F2. Further, the first housing 62 of the first lamp assembly 14 includes a plurality of inboard extending flanges 14e (see FIG. 11). Here, the front fascia 12 further comprise a grill 66. In the illustrated embodiment, the first lamp support 64 and the inboard extending flanges 14e (see FIG. 11) are fixedly attached to the grill 66 via a plurality of third fasteners F3 (see FIGS. 9, 10 and 11). One of the plurality of inboard extending flange 14e is fixedly attached to the grill 66 via a fourth fastener F4 (see FIG. 11).

Referring to FIGS. 3, 5, 7 and 9, the second lamp assembly 16 and the fourth lamp assembly 20 each includes a second lens 70 and a second housing 72 (also referred to as a second lamp housing 72) (see FIG. 3). In the case of the second lamp assembly 16, the second lens 70 defines a forward facing surface 16a of the second lamp assembly 16 and the second housing 72 defines a rearward facing surface 16b of the second lamp assembly 16 (see FIG. 3). In the case of the fourth lamp assembly 20, the second lens 70 defines a forward facing surface 20a of the fourth lamp assembly 20, and the second housing 72 defines a rearward facing surface 20b of the fourth lamp assembly 20) (see FIG. 3). The second lens 70 is a transparent element that transmits light produced by the light producing elements (not shown) within second housing 72. The second housing 72 defines a partially hollow interior with the second lens 70 with lighting elements installed therein. The second lens 70 is attached to the second housing 72 by any of a variety of attachment designs, such as adhesive material(s) and/or a plurality of fastener elements such as a plurality of snap fitting projections 16c (see FIG. 5). In addition, the second lamp assembly 16 includes at least one of a headlamp, a low beam lamp and a high beam lamp.

Referring to FIGS. 7 and 9, the second housing 72 includes a plurality of attachment points in order to install the second lamp assembly 16 to the front portion 24 of the vehicle frame structure 22, the grill 66 and the front fascia 12, as described below.

Figure 15:
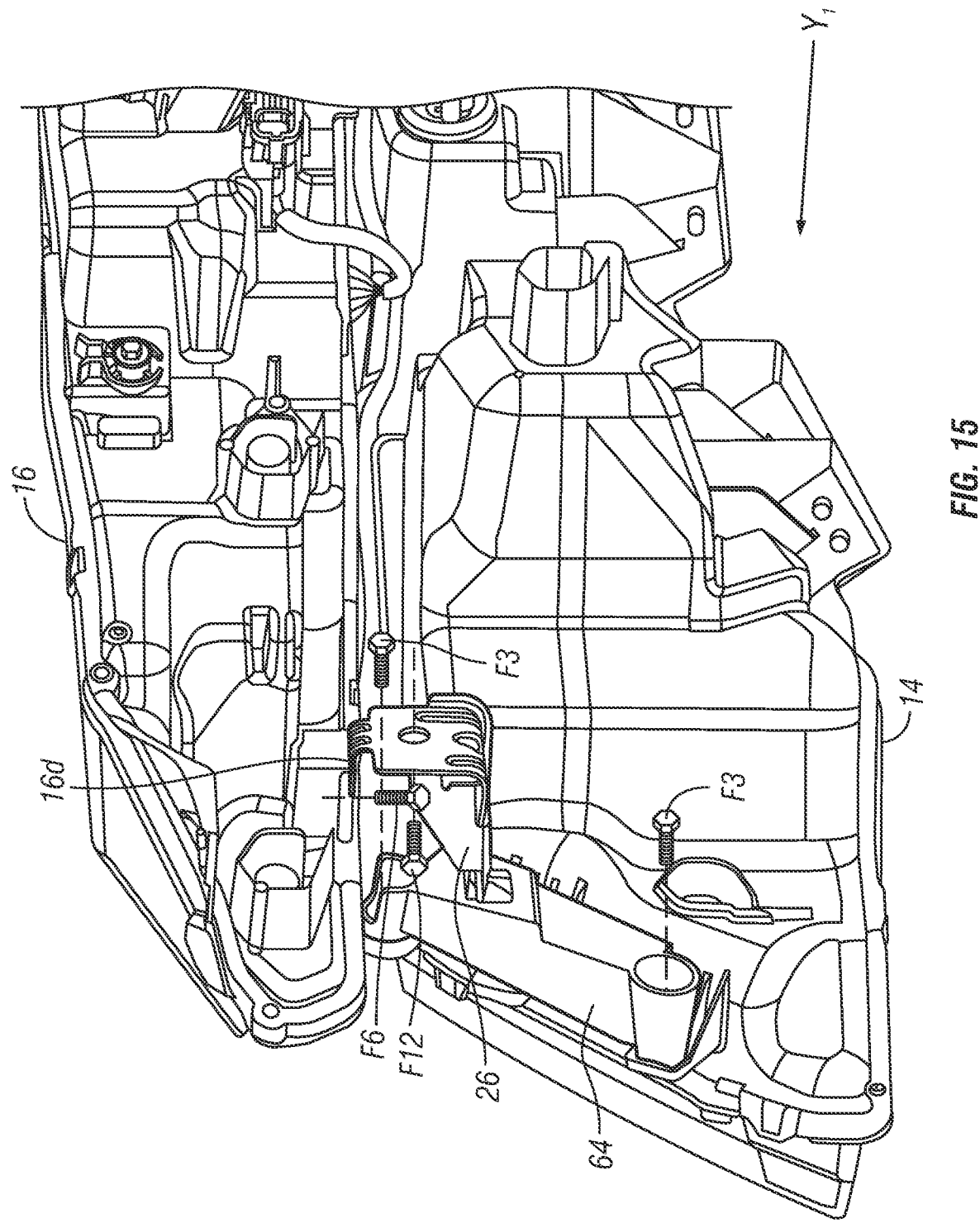
FIG. 15 is a rear perspective view of the first support attachment to vehicle showing the first lamp assembly, the second lamp assembly, the first support, the first lamp support and the various fasteners in accordance with the first embodiment.

The second housing 72 of the second lamp assembly 16 includes an inboard extending flange 16c (see FIG. 7) and a lower surface 16d (see FIG. 15). The inboard extending flange 16c connects via fastener F5 to the first upper panel 34A (see FIG. 7). The first support 26 connects via fastener F6 to the lower surface 16d (see FIG. 15). More specifically, the first lamp assembly 14 is attached to the first support 26 at an inboard portion of the first lamp assembly 14. Further, the second housing 72 of the second lamp assembly 16 includes a pair of rearward extending flanges 16e that are fixedly attached to the fender 44 via a fasteners F9 and F10 (see FIGS. 7 and 9).

Referring to FIGS. 1-3, the front fascia 12 is shaped and designed in accordance with the design of the vehicle V. The overall shape of the front fascia 12 depicted in the drawings is one example of the overall shape of the front fascia 12. In other words, the front fascia 12 is not limited to the depicted shape and can have alternative shapes and contours. The front fascia 12 is attached to the front portion 24 of the vehicle frame structure 22, the fender 44, the first lamp assembly 14 and the second lamp assembly 16 as described below.

Figure 14:
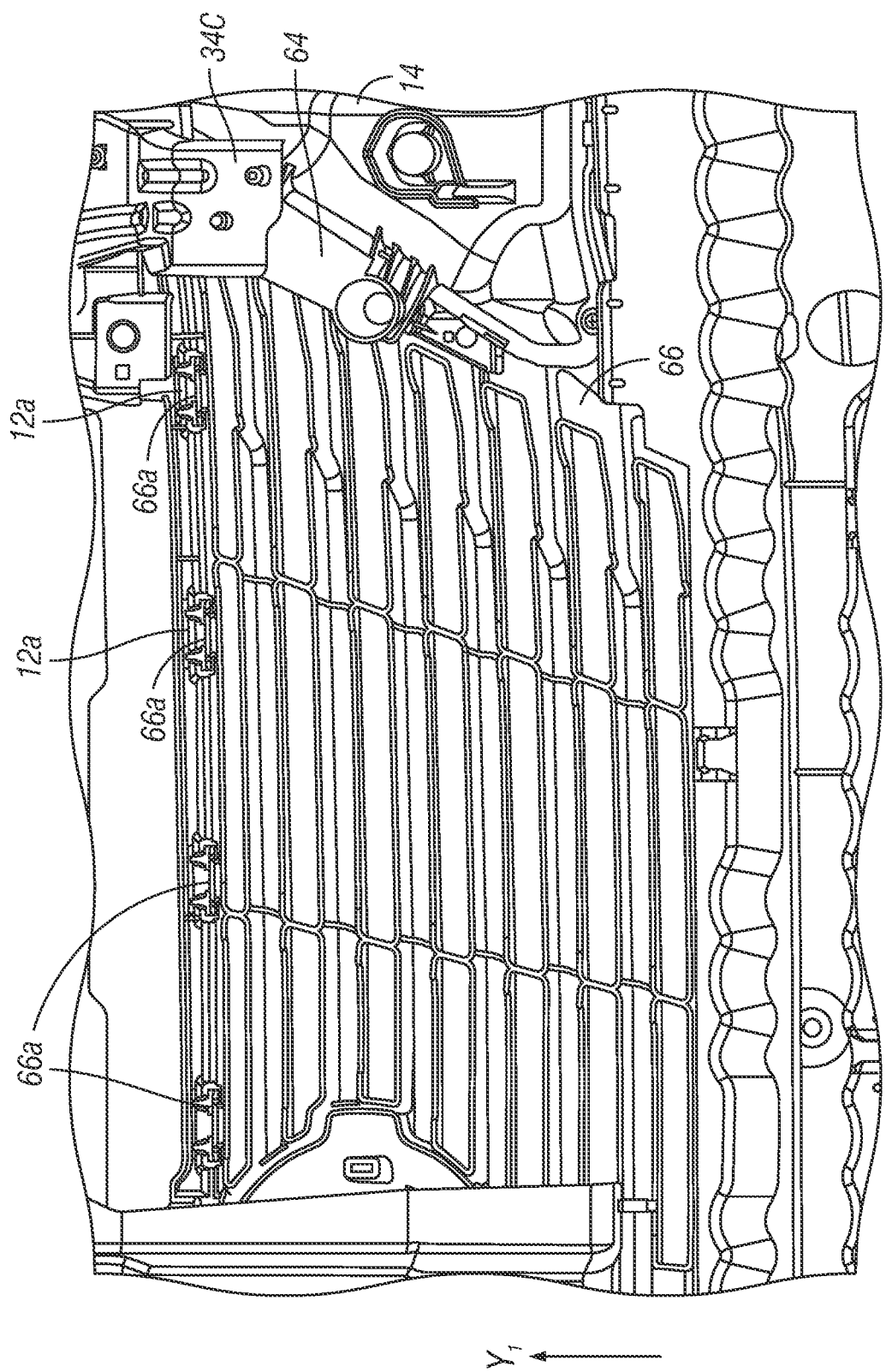
FIG. 14 is a rear view of the grill attachment to the fascia showing the grill, the fascia and the first lamp assembly in accordance with the first embodiment.

Referring to FIGS. 2, 3 and 14, the front fascia 12 further includes the front grill 66 that overlays a central area of a forward facing surface of the front fascia 12 and is attached thereto. The front fascia 12 includes a plurality of slots 12a that each receive a corresponding one of a plurality of snap fitting projections 66*a* formed on a rearward surface of the front grill 66, (see FIG. 14).

Figure 13:
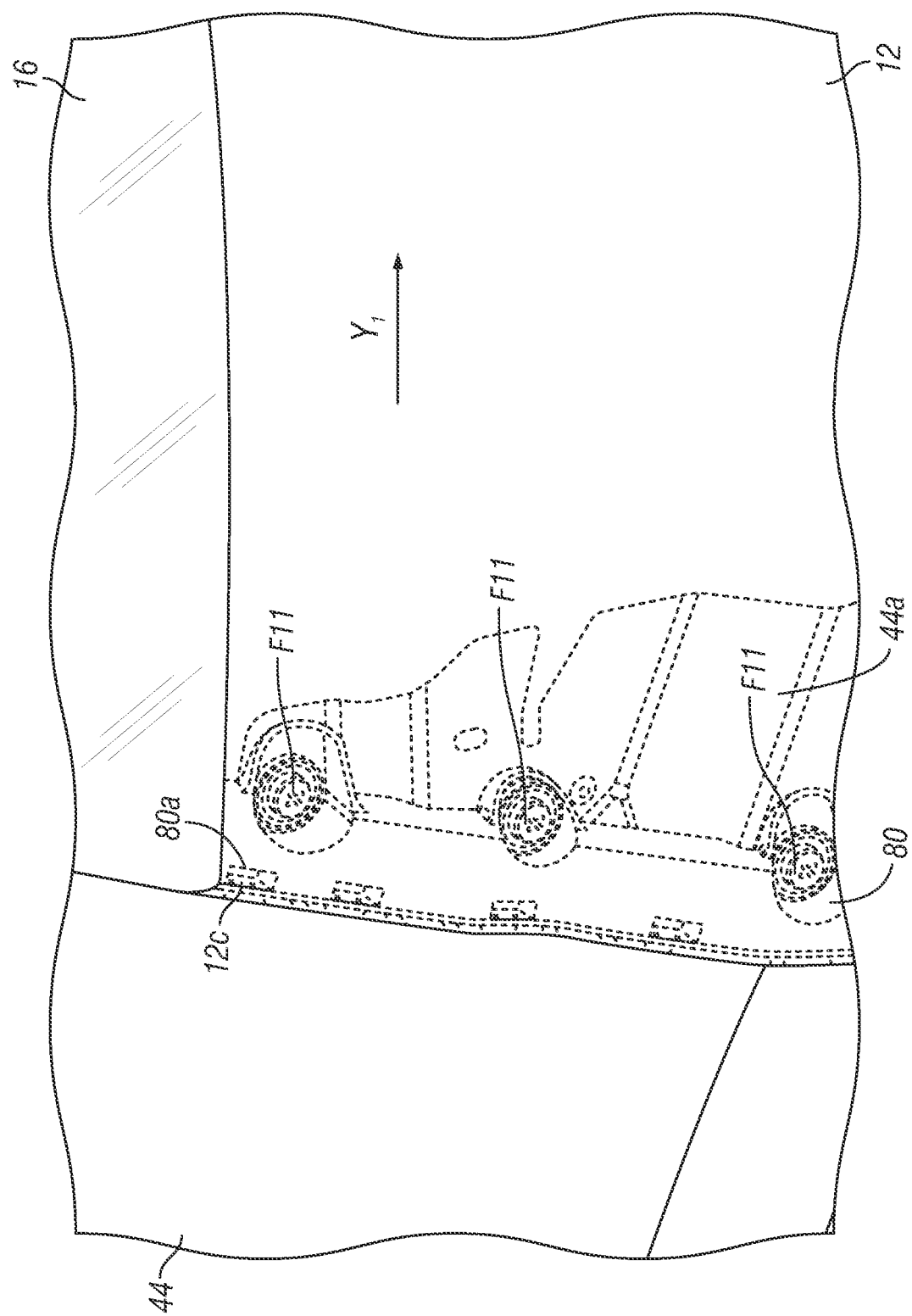
FIG. 13 is a side view of the fender attachment to the fascia showing the fender, the fascia and the hidden fender bracket in accordance with the first embodiment.

As mentioned above, the fender bracket 80 overlays a portion of the side flange 44*a* of the fender 44 (see FIGS. 7 and 13). The fender bracket 80 is attached to a forward end of the fender 44 by a plurality of eleventh fasteners F11 (see FIG. 13). A rearward end of the front fascia 12 is fixed to the forward end of the fender 44 at the fender bracket 80 by a snap fitting projections 12*c*. The fender bracket 80 includes a plurality of slots 80*a* that each receive a corresponding one of the snap fitting projections 12*c* formed on a rearward surface of the front fascia 12 (see FIG. 13).

Referring to FIGS. 3 and 7, the front fascia 12 includes two central attachment brackets 12*b*. The attachment brackets 12*b* attach to the first upper panel 34A of the radiator support structure 34 (see FIG. 7).

Referring to FIGS. 3, 5 and 16-25, a description of the first support 26 and the first lamp support 64 is now provided. The first support 26 is generally a C shaped structure with a first lamp attachment portion 82, a vehicle attachment portion 83, a second lamp attachment portion 84 and a brace 85 (see FIG. 24).

Figure 24:
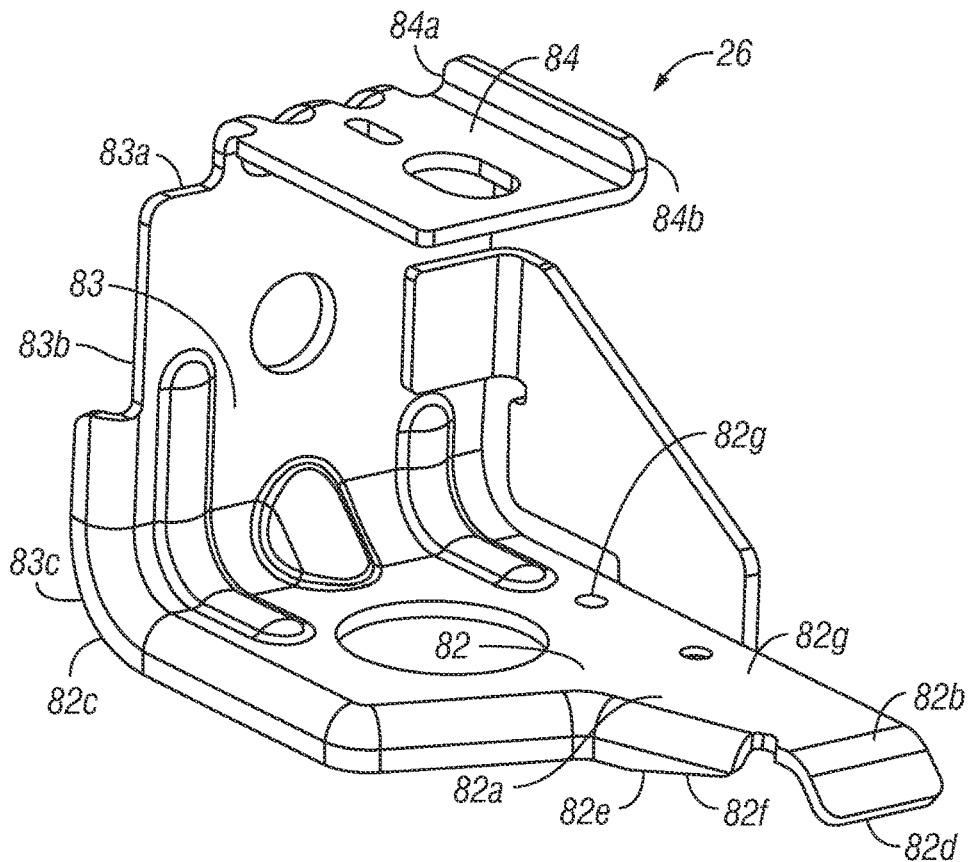
FIG. 24 is a perspective view of the first support illustrated in FIGS. 18 to 23.

Referring to FIG. 24, the vehicle attachment portion 83 includes a first end 83*a*, an upright section 83*b* and a second end 83*c*. The upright section 83*b* has an opening aligned with another opening in the second support 34C. The opening of the second support 34C includes a weldnut W1 (see FIG. 17) on the rearward surface of the second support 34C. A fastener F12 is received in the opening of the vehicle attachment portion 83, the opening of the second support 34C and the weldnut W1 of the second support 34C (see FIGS. 15 and 17). In other words, the vehicle attachment portion 83 of the first support 26 is attached to the second support 34C. Stated differently, the front portion 24 of a vehicle frame structure 22 includes a first upper panel 34A and a second support 34C attached to the first upper panel 34A and the first lamp assembly 14 (see FIG. 7).

Referring to FIG. 24, the first lamp attachment portion 82 (also referred to as a protrusion or a flange) includes a support portion 82*a* and a ramp portion 82*b*. The first lamp attachment portion 82 has a first end 82*c* and a second end 82*d*. The first end 82*c* of the first lamp attachment portion 82 is attached to the second end 83*c* of the vehicle attachment portion 83. The second end 82*d* of the first lamp attachment portion 82 extends in approximately the forward direction Y1 toward the first lamp assembly 14 (see FIG. 17). Stated differently, the vehicle attachment portion 83 has an upright section 83*b* with a first end 83*a* and a second end 83*c*, the first lamp attachment portion 82 extends forwardly from the second end 83*c* of the vehicle attachment portion 83.

Figure 17:
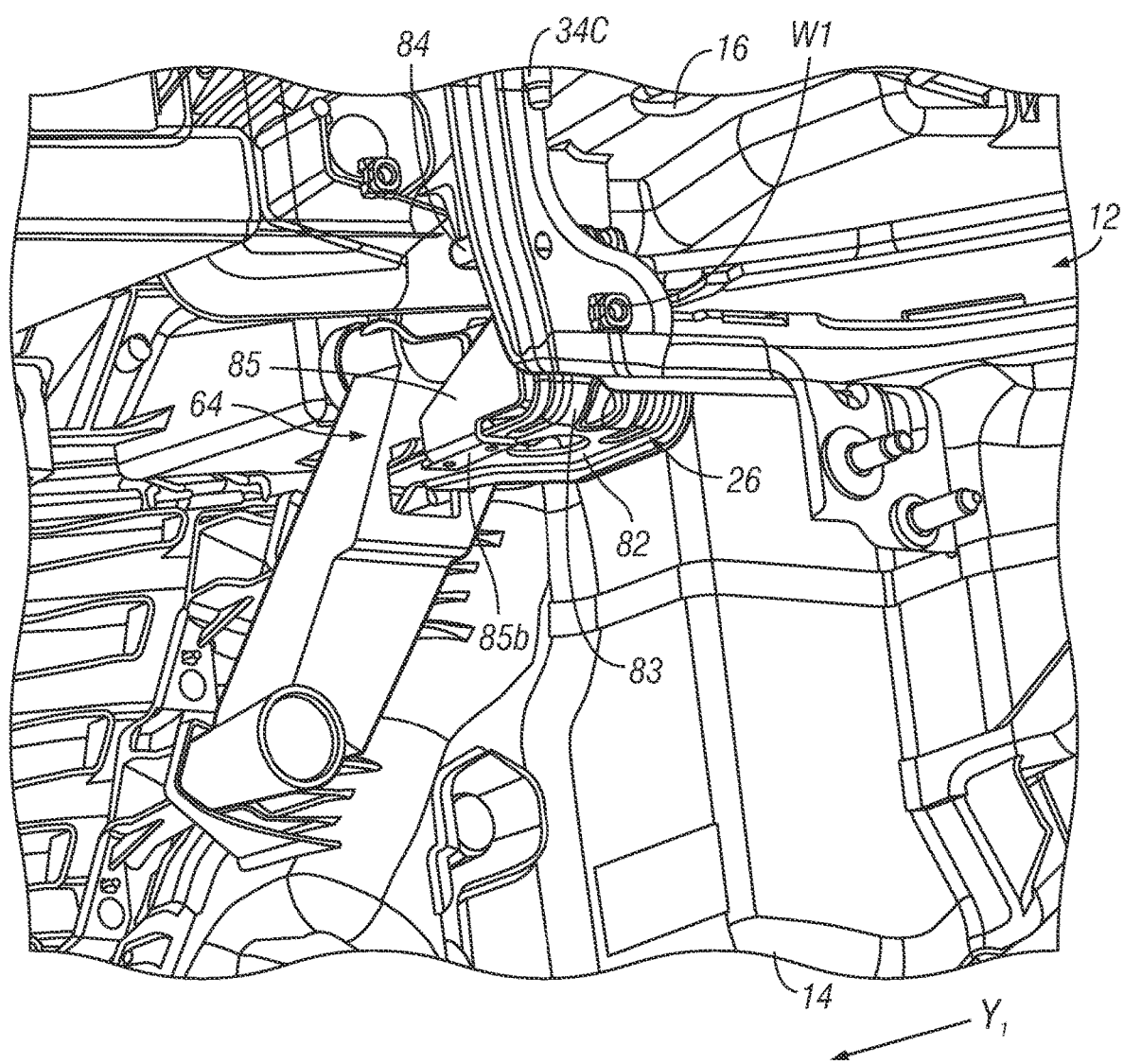
FIG. 17 is a rear perspective view of the attachments for the first support attachment and the first lamp support showing the first lamp assembly, the second lamp assembly, the second support and the grill in accordance with the first embodiment.
Figure 18:
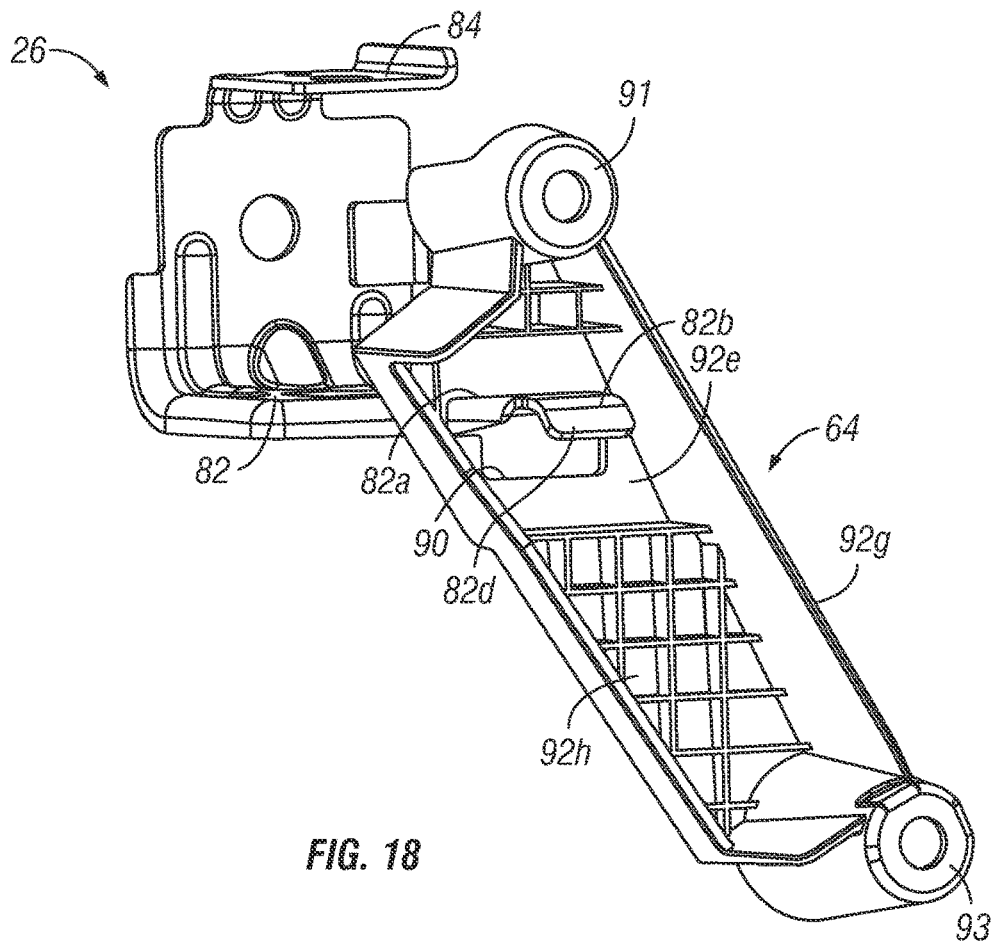
FIG. 18 is a perspective view of the first support and the first lamp support removed from the vehicle showing the ramp portion of the first support and the slot of the first lamp support in accordance with the first embodiment.
Figure 19:
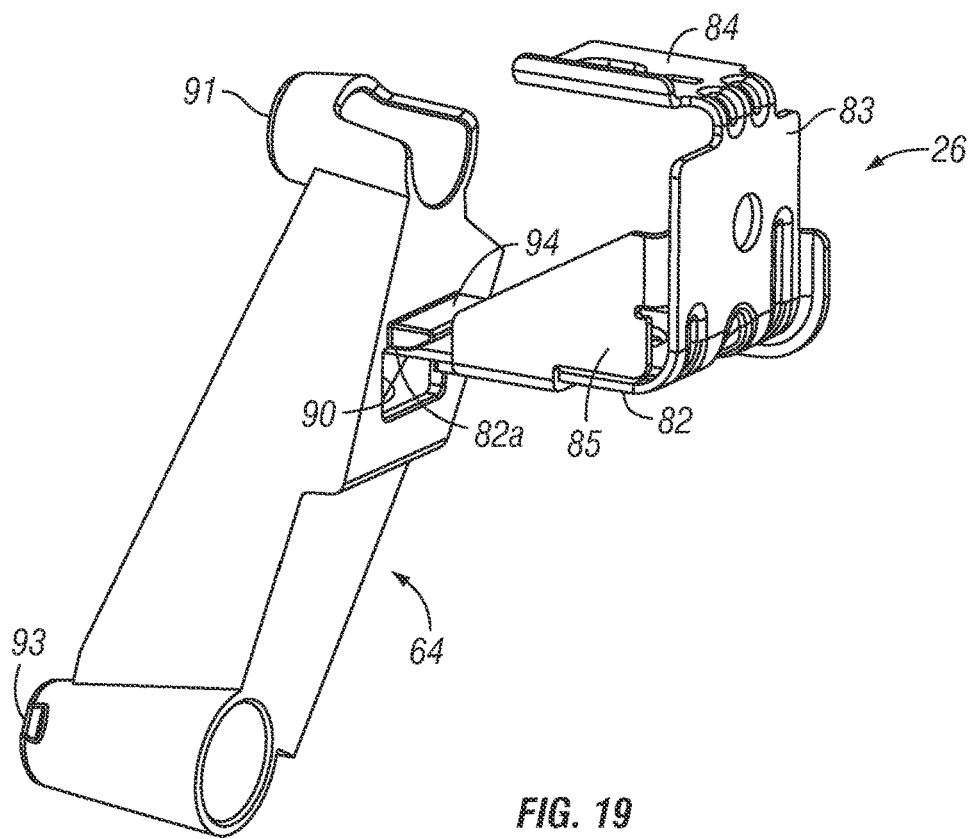
FIG. 19 is another perspective view of the first support and the first lamp support illustrated in FIG. 18.
Figure 20:
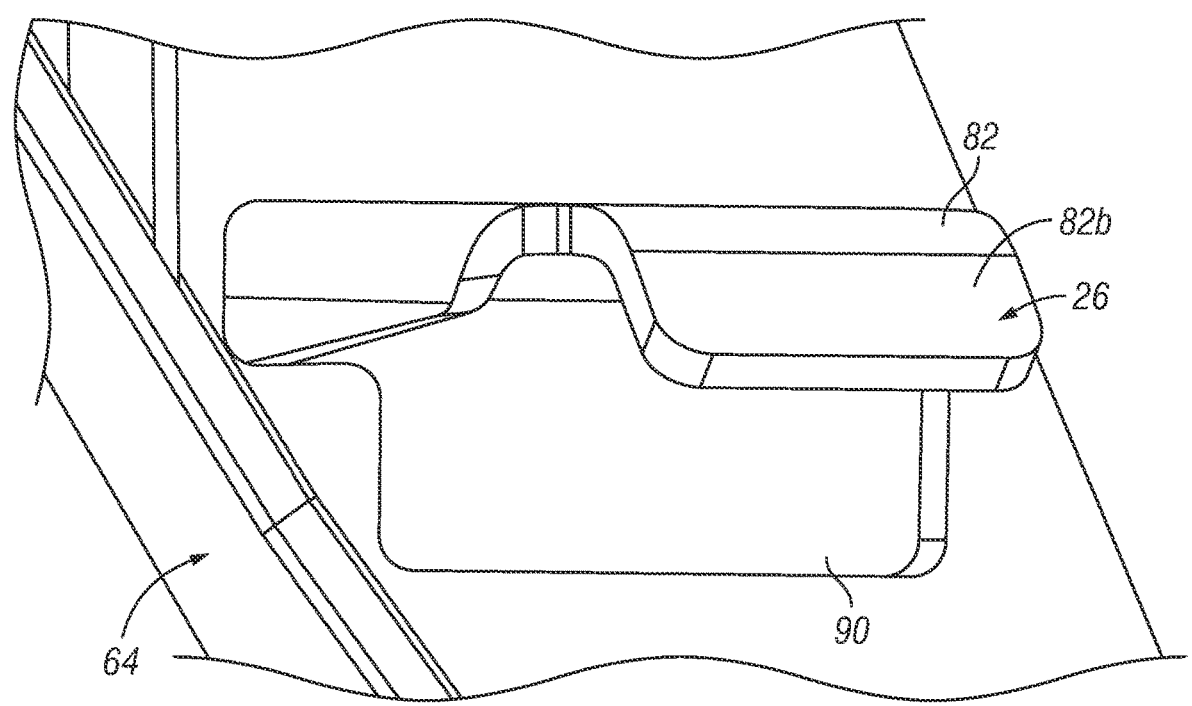
FIG. 20 is a patrial enlarged view of portions the first support and the first lamp support illustrated in FIGS. 18 and 19.
Figure 21:
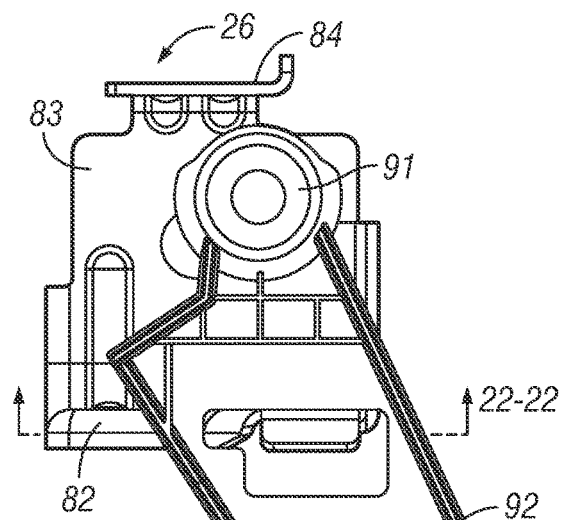
FIG. 21 is a front view of the first support and the first lamp support removed illustrated in FIGS. 18 to 20.
Figure 22:
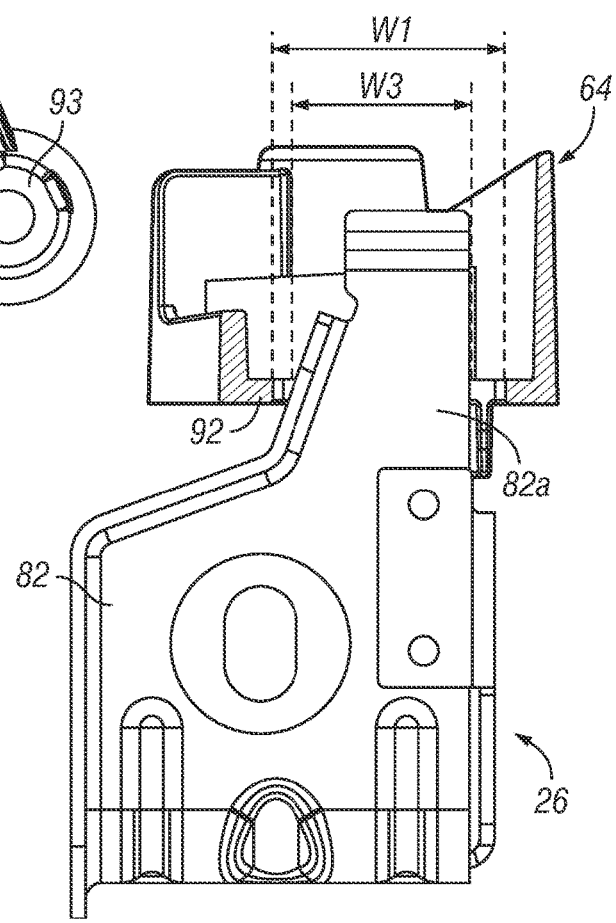
FIG. 22 is a cross sectional view the first support and the first lamp support illustrated in FIGS. 18 to 21 as seen a long section line 22-22 in FIG. 21.
Figure 23:
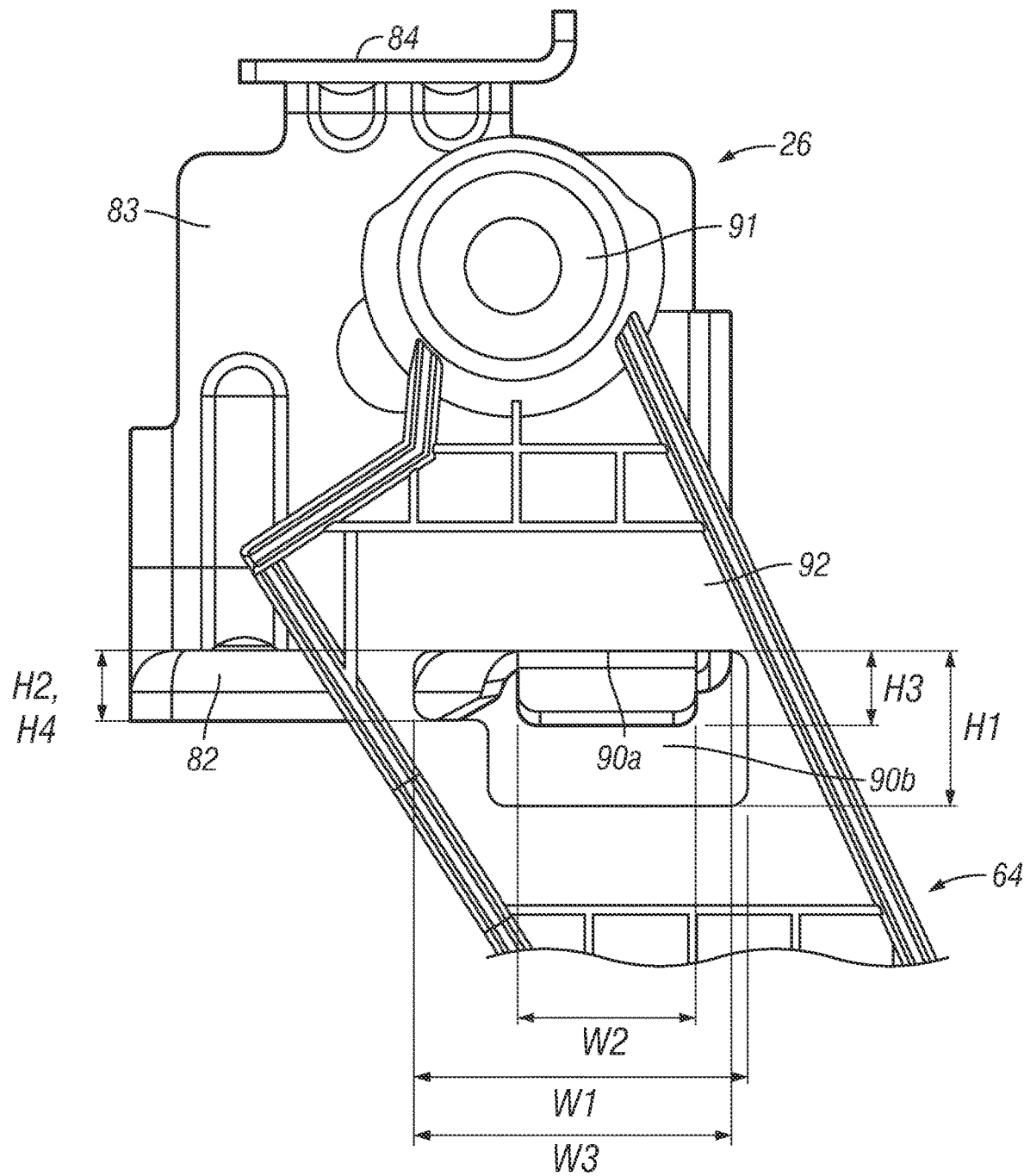
FIG. 23 is an enlarged view of the first support and the first lamp support illustrated in FIGS. 18 to 22.

Referring to FIGS. 17, 18 and 24, the support portion 82*a* of the first lamp attachment portion 82 supports the first lamp support 64 when the first lamp support 64 is in the installed state (see FIGS. 17 and 18). The support portion 82*a* includes a downwardly extending wall 82*e* defining the fitting feature 82*f* (see FIG. 24). The lower edge of the wall tapers vertically as the flange 82 extends forwardly. The support portion 82*a* of the flange 82 tapers in the lateral direction X as the flange 82 extends forwardly with respect to the vehicle in the installed state. The support portion 82*a* is sized and shaped to fit more snugly into the slot 90 in the first lamp assembly 14 after the fascia 12 is installed to the front portion 24 of a vehicle frame structure 22 (see FIG. 18).

Referring to FIG. 24, the ramp portion 82*b* extends forwardly and downwardly from the support portion 82*a* in the installed state. The ramp portion 82*b* is sized and shaped to more easily fit into the slot 90 in the first lamp assembly 14 as the fascia 12 is installed to the front portion 24 of a vehicle frame structure 14 (see FIGS. 18 and 23).

Figure 16:
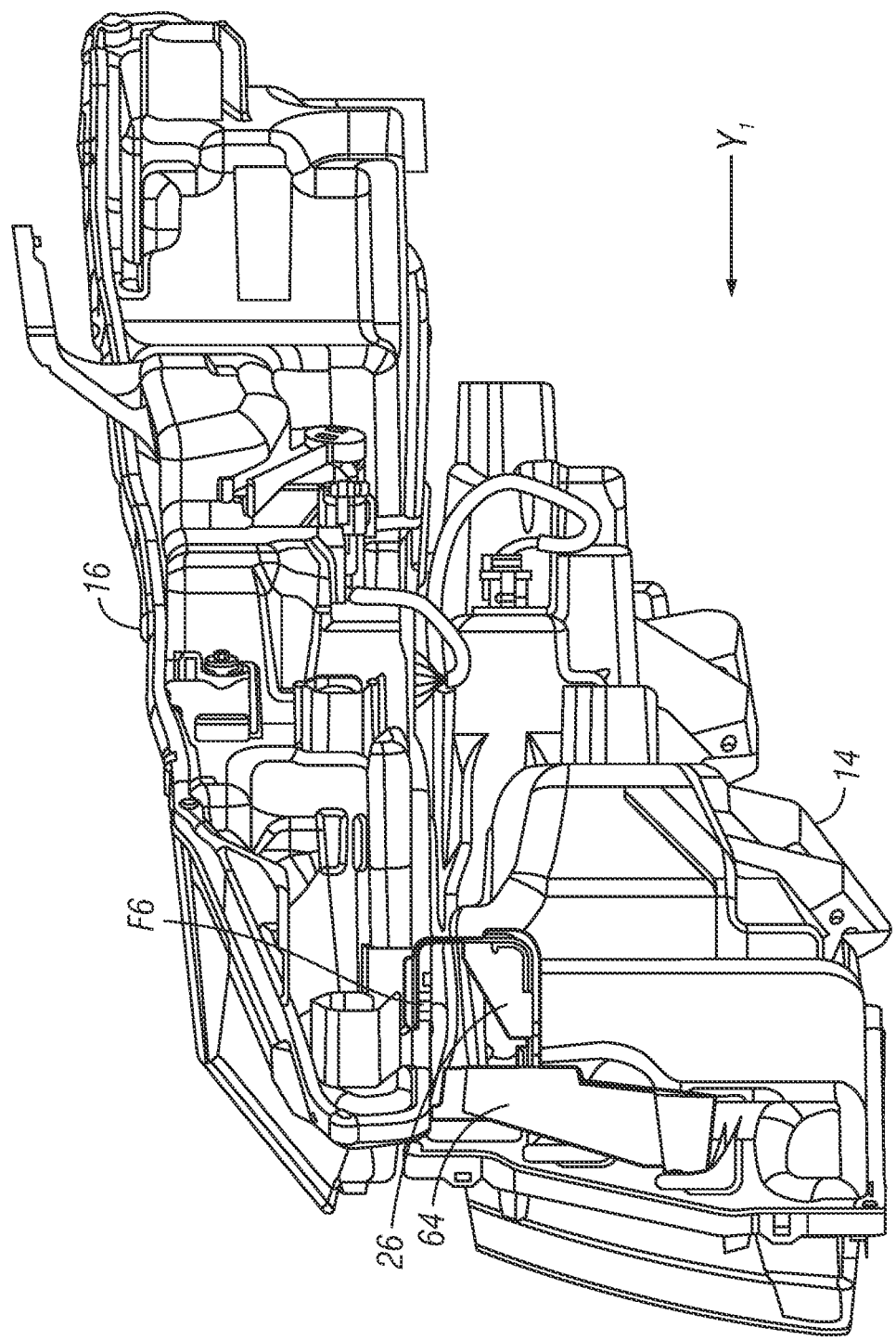
FIG. 16 is a side view of the first support attachment to vehicle showing the first lamp assembly, the second lamp assembly, the first support and the first lamp support in accordance with the first embodiment.

Referring to FIGS. 15, 16 and 24, the second lamp attachment portion 84 has a first end 84*a* and a second end 84*b*. The first end 84*a* of the second lamp attachment portion 84 is attached to the first end 83*a* of the vehicle attachment portion 83. The second end 84*b* of the second lamp attachment portion 84 extends forwardly toward the second lamp assembly 16 (see FIG. 16). The second lamp attachment portion 84 has an opening aligned with another opening in the second lamp assembly 16. A fastener F6 is received in the opening of the second lamp attachment portion 84 and the opening of the second lamp assembly 16 (see FIGS. 15, 16 and 24). The fastener F6 can be, for example, a bolt, screw or push pin clip. Stated differently, the first support 26 further includes a second lamp attachment portion 84 extending forwardly from the first end of the upright section 83*b*, the second lamp assembly 16 is attached to the second lamp attachment portion 84.

Figure 25:
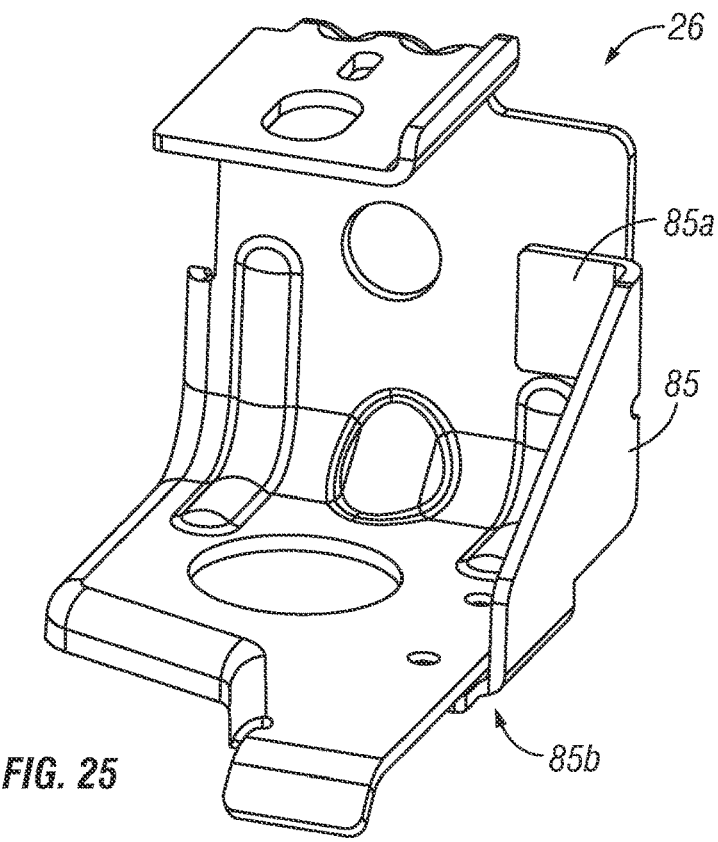
FIG. 25 is a perspective view of the first support illustrated in FIG. 24.

Referring to FIGS. 24-25, the brace 85 is attached to an upright section 83*b* of the vehicle attachment portion 83 and the first lamp attachment portion 82. More specifically, the vehicle attachment portion 83 has an upright section 83*b* extending approximately perpendicular from first lamp attachment portion 82, and the first support 26 further includes a brace 85 attached between the upright section 83*b* of the vehicle attachment portion 83 and the first lamp attachment portion 82. Further, the brace 85 includes a first tab 85*a* attached to the upright section 83*b* and a second tab 85*b* attached to the first lamp attachment portion 82 (see FIGS. 17 and 25). More specifically, the first tab 85*a* and the second tab 85*b* are fixedly attached to the first support 26 via, for example, mechanical fasteners or welding techniques. Alternatively, while FIG. 24 shows the first tab 85*a* and the second tab 85*b* are fixedly attached to the first support 26, the brace 85 can be unitary with the first support 26.

Alternatively, while FIGS. 16, 17 and 24 show the first lamp attachment portion 82 of the first support 26 extends forwardly from the vehicle attachment portion 83 to the slot 90, the first support 26 can have an upright step portion (not shown) between a first portion 83*g* of the vehicle attachment portion 83 and the support portion 83*a*. In this alternative, the first end 82*c* of the first lamp attachment portion 82 is attached to the second end 83*c* of the vehicle attachment portion 83. The first portion 82*g*, the support portion 82*a* and the ramp portion 82*b* of the first lamp attachment portion 82 extend forwardly from vehicle attachment portion 83. The upright step portion connects the support portion 82*a* to the first portion 82*g*.

Since the first support 26 on one side of the vehicle and the another first support 26 on the other side of the vehicle are identical except that they are mirror images of one another (see FIGS. 7 and 8), description of the first support 26 applies equally to another first support 26. For example, an additional first support 26 including an additional vehicle attachment portion 83 configured to be attached to the front portion 24 of a vehicle frame structure 22 and an additional third lamp attachment portion 82 attached to the third lamp assembly 18 such that the additional first support 26 supports the third lamp assembly 18 to the front portion 24 of the vehicle frame structure 22 in a state where the vehicle front end assembly 10 is attached to the front portion 24 of a vehicle frame structure 22. Thus, only one side of the first lamp assembly 14 and second lamp assembly 16 is described hereinbelow for the sake of brevity.

Figure 26:
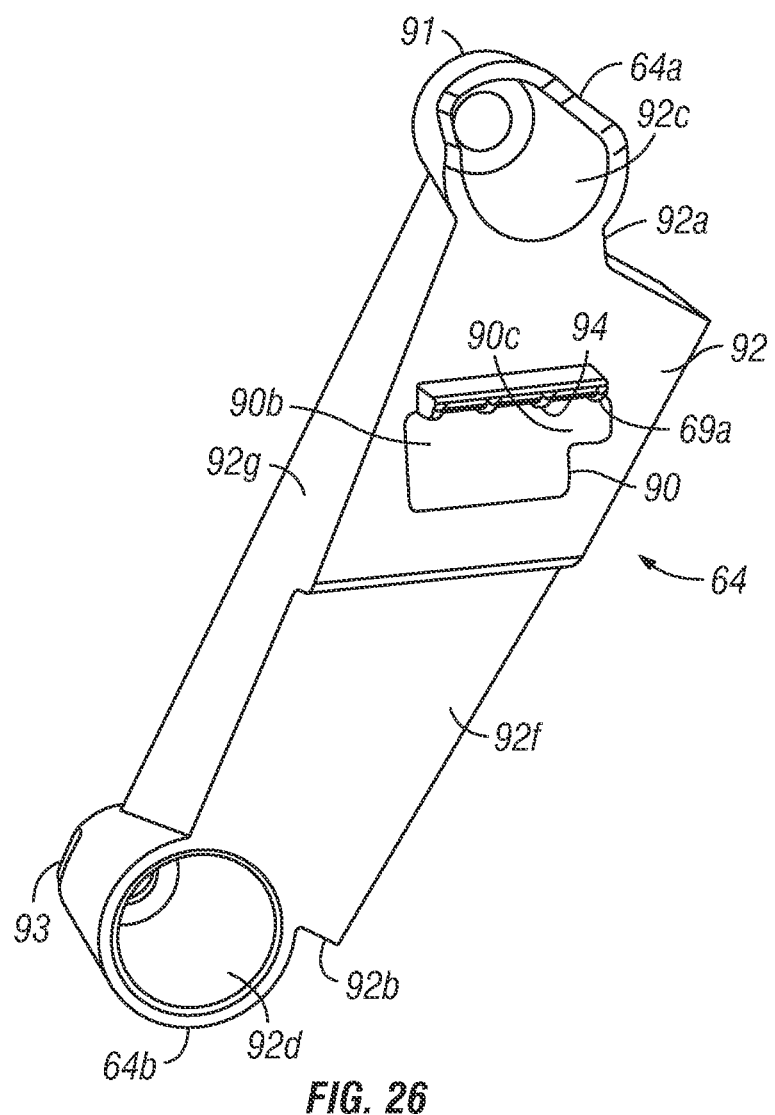
FIG. 26 is a perspective view of the first lamp support illustrated in FIGS. 18 to 22.

Referring to FIGS. 17, 18 and 26, the first lamp support 64 includes a first housing attachment portion 91, a first support attachment portion 92, a second housing attachment portion 93, a slot 90 and a receiving ramp 94 (see FIG. 26). The first support attachment portion 92 has a planar body having a first end 92a and a second end 92b. The first end 92a of the planar body has a first wall 92c extending forwardly and attaching to the first housing attachment portion 91. The second end 92b of the planar body has a second wall 92d extending forwardly and attaching to the second housing attachment portion 93. The first housing attachment portion 91 and the second housing attachment portion 93 have a first opening and second opening, respectively. The first wall 92c and the second wall 92d of the first lamp support 64 are at least partially cylindrical walls surrounding the first opening and the second opening, respectively.

Referring to FIGS. 10, 15, 17 and 26, the first opening of the first housing attachment portion 91 aligns with openings in the first lamp assembly 14 and a first doghouse on the front fascia 12 to receive a fastener F3 (see FIGS. 10 and 11). The second opening of the second housing attachment portion 93 aligns with openings in the first lamp assembly 14 and a second doghouse on the grill 66 to receive a fastener F3 (see FIGS. 10, 11, 17 and 26). The planar body of the first support attachment portion 92 has a forwardly facing surface 92e and a rearwardly facing surface 92f (see FIGS. 18 and 26). The body includes a third wall 92g extending forwardly from an inboard side of the forwardly facing surface 92e and a fourth wall 92h extending forwardly from an outboard side of the forwardly facing surface 92e (see FIG. 18).

Referring to FIGS. 18, 21, 23 and 26, the slot 90 (also referred to as an opening) extends from a rearward facing surface 92f of the first support attachment portion 92 of the first lamp support 64 to the forward facing surface 92e of the first support attachment portion 92 (see FIGS. 18 and 26). The slot 90 has an upper edge 90a extending in a lateral direction X of the vehicle in the installed state (see FIG. 23). During installation of the fascia 12, the first lamp support 64 includes the opening 90 for receiving the protrusion 82 of the first lamp attachment portion 82 (see FIG. 18). The first lamp attachment portion 82 of the first support 26 (also referred to as a protrusion or a flange) has an upper surface 82g contacting the upper edge 90a of the slot 90. Stated differently, the upper edge 90a of the slot 90 slidably contacts the upper surface 82g of the flange 82 for longitudinal movement during assembly. The slot 90 has a locating portion 90b and a fitting portion 90c (see FIG. 26). The ramp portion 82b of the first support 26 is received by the locating portion 90b of the slot 90. Further, the ramp portion 82b has a third height H3 and the locating portion has a first height H1 (see FIG. 23). The third height H3 is 5-80% of the first height H1. In addition, the slot 90 has a first lateral width W1, and the ramp portion 82b has a second lateral width W2 that is greater than the first lateral width W1. The smaller ramp portion 82b can be more easily inserted into the larger slot 90. During installation, this arrangement allows the ramp portion 82b to move within slot 90 in the lateral direction X, the lengthwise direction Y, and the vertical direction Z.

With the fascia 12 in the installed position, the support portion 82a of the first support 26 is received by a fitting portion 90c of the slot 90, referring to FIGS. 18, 23, 24 and 26. The support portion 82a includes a downwardly extending wall 82e defining a fitting feature 82f (see FIG. 24). The lower edge of the wall on the first support 26 tapers vertically as the flange extends forwardly. The fitting portion 90c of the slot 90 has second height H2 and the fitting feature 82f has a fourth height H4 (see FIG. 23). The fourth height H4 that is approximately equal to the second height H2.

The fitting feature 82f allows the first support 26 to maintain a vertical relationship to the first lamp assembly 14 in the installed position (see FIGS. 18 and 24). Stated differently, the front portion 24 of a vehicle frame structure 22, the second support 34C and the first support 26 hold a portion of the weight of the first lamp support 64, the first lamp assembly 14 and the front fascia 12 (see FIG. 17). More specifically, the support portion 82a of the first support 26 holds a portion of the weight of the first lamp support 64 on the first lamp assembly 14 (see FIG. 18). In other words, the support portion 82a of the first support 26 restricts only the vertically directed motion and the horizontally directed motion of the first lamp assembly 14.

With the fascia 12 in the installed position, the support portion 82a of the first support 26 is received by the fitting portion 90c of the slot 90, referring to FIGS. 18, 22-24 and 26. The slot 90 has a first lateral width W1 and the support portion 82a of the flange 82 has a third lateral width W3 (see FIG. 23). The third lateral width W3 is 70-98% of the first lateral width W1. The width of the support portion 82a and the width of the slot 90 prevents the first support 26 from moving laterally within the slot 90 of the first lamp assembly 14 in the installed position.

Figure 27:
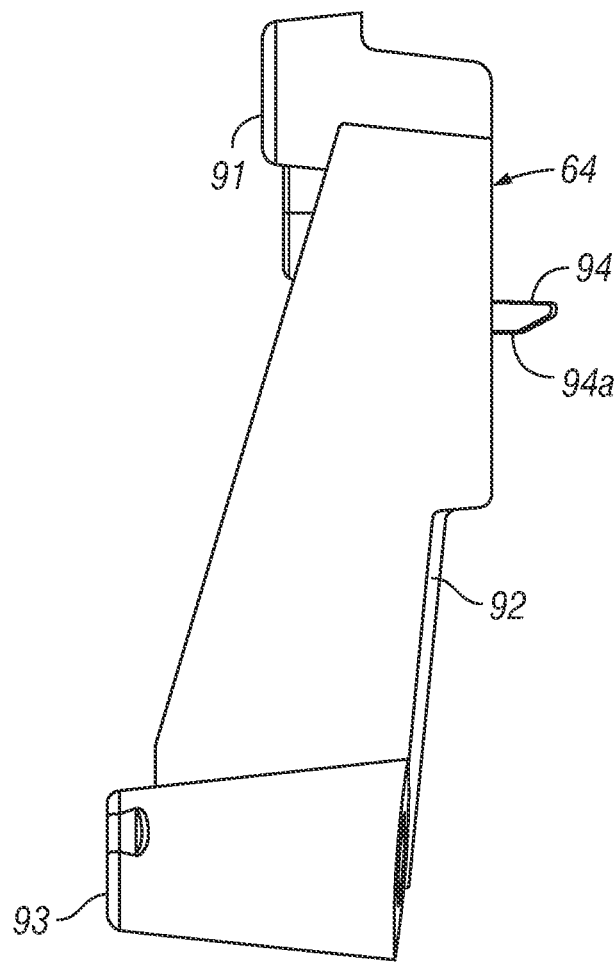
FIG. 27 is a side view of the first lamp support illustrated in FIG. 26.

Further, referring to FIGS. 16, 24, 26 and 27, the first lamp assembly 14 includes a receiving ramp 94 extending rearwardly from an area adjacent the upper edge 68a of the slot 90 (see FIG. 27). The lower surface 94a of the receiving ramp 94 transitions into the lower surface of the upper edge 90a of the slot 90 (see FIGS. 23 and 26). The receiving ramp 94 of the first lamp support 64 contacts the ramp portion 82b of the first lamp attachment portion 82 and guides the ramp portion 82b into the slot 90 during installation (see FIG. 19).

Moreover, the first lamp support 64 is a separate and distinct part from the first lamp housing 72. The first lamp support 64 is attached to the first lamp assembly 14 with at least one first fastener (see FIGS. 10 and 11).

Alternatively, while FIGS. 10, 15, 17, 18, 19 and 26 show the first lamp support 64 is a separate and distinct part from the first lamp housing 62, the first lamp support 64 can be unitary with the first lamp housing 62 (not shown). In this alternative, the slot 90 is located within a rearward facing surface 14a of the first housing 62 of the first lamp assembly 14. In other words, the first lamp assembly 14 has an opening 90. The first lamp attachment portion 82 of the first support 26 includes a protrusion extending forwardly through the opening 90.

In another alternative (not shown), while FIGS. 10, 15 and 17 show the vehicle attachment portion 83 of the first support 26 attaches to the second support 34C, a third support 96 can connect the second support 34C to the vehicle attachment portion 83 of the first support 26. The third support 96 can be C shaped with a first attachment portion 96a, a connecting portion 96b and a second attachment portion 96c. The first attachment portion 96a extends laterally and attaches to the second support 34C. The second attachment portion 96c extends laterally and attaches to the vehicle attachment portion 83 of the first support 26. The connecting portion 80b extends forwardly and attaches to a lateral side the first attachment portion 96a and to a lateral side of the second attachment portion 96c.

Further in this alternative, the second attachment portion 96c of the third support 96 includes a forwardly projecting projection 96*d* (not shown). The projection 96*d* includes a downwardly extending flange 96*e* that connects via a fastener to an aperture in the first lamp support 64. The projection 96*d* of the third support 96 extends approximately parallel to the support portion 82*a* of the first support 26. The aperture in the first lamp support 64 is adjacent to the slot 90 in the first lamp support 64.

A description of the assembly process between the front fascia 12 and the front portion 24 of the vehicle frame structure 22 is now provided with specific reference to FIGS. 3, 4, 17, 24 and 26.

To assemble the front end assembly 10, the second lamp assembly 16 is attached to the front portion 24 of a vehicle frame structure 22, referring to FIGS. 3-5, 7 and 9. Fasteners attach each flange of the second lamp assembly 16 to the front portion 24 of a vehicle frame structure 22 (see FIGS. 7 and 9). In addition, the first support 26 and second support 34C are attached to the front portion 24 of a vehicle frame structure 22 (see FIGS. 5 and 7). The first lamp support 64 is attached to the first lamp assembly 14 (see FIG. 7). Also, the first lamp assembly 14 is attached to the front fascia 12 (see FIGS. 10 and 11).

Then, the font end assembly 10 including the front fascia 12 is attached to the front portion 24 of a vehicle frame structure 22 (see FIG. 2). The front fascia 12 is attached at the first support 26, the fender brackets 80 and the second upper panel 34B (FIGS. 7, 13 and 17). The slot 90 on the first lamp assembly 14 is received by the ramp portion 82*b* on the first support 26 (see FIGS. 17, 18 and 24).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment (s), the following directional terms "forward", "rearward", "above", "downward", "vertical", "horizontal", "below" and "transverse" as well as any other similar directional terms refer to those directions of a vehicle equipped with the vehicle front end assembly. Accordingly, these terms, as utilized to describe the present invention should be interpreted relative to a vehicle equipped with the vehicle front end assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the vehicle field from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle front end assembly comprising:
    a front fascia configured to be attached to a front portion of a vehicle frame structure;
    a first lamp assembly attached to the front fascia; and
    a first support including a vehicle attachment portion configured to be attached to the front portion of the vehicle frame structure and a first lamp attachment portion attached to the first lamp assembly such that the first support supports the first lamp assembly to the front portion of the vehicle frame structure in an installed state where the vehicle front end assembly is attached to the front portion of the vehicle frame structure,
    the first lamp assembly having a rearwardly facing surface including an opening, and the first lamp attachment portion of the first support including a protrusion extending forwardly through the opening on the rearwardly facing surface in a longitudinal direction of the vehicle frame structure in the installed state.

2. The vehicle front end assembly according to claim 1, wherein
    the opening includes an upper edge extending in a lateral direction of the vehicle frame structure in the installed state, and
    the protrusion has an upper surface contacting the upper edge of the opening.

3. The vehicle front end assembly according to claim 2, wherein
    the protrusion includes a support portion and a ramp portion, the ramp portion extends forwardly and downwardly from the support portion in the installed state.

4. The vehicle front end assembly according to claim 3, wherein
    the opening has a first lateral width, and
    the ramp portion has a second lateral width that is greater than the first lateral width.

5. The vehicle front end assembly according to claim 2, wherein
    the upper edge of the opening slidably contacts the upper surface of the protrusion for longitudinal movement during assembly.

6. The vehicle front end assembly according to claim 4, wherein
    the support portion of the protrusion tapers in the lateral direction as the protrusion extends forwardly with respect to the vehicle frame structure in the installed state.

7. The vehicle front end assembly according to claim 5, wherein
    the opening has a locating portion and a fitting portion, the locating portion has a first height and the fitting portion having a second height,
    the ramp portion has a third height that is approximately between 5-80 percent of the first height, and
    the protrusion includes a fitting feature having a fourth height that is approximately equal to the second height.

8. The vehicle front end assembly according to claim 2, wherein
the first lamp assembly includes a receiving ramp extending rearwardly from an area adjacent the upper edge of the opening.

9. The vehicle front end assembly according to claim 1, wherein
the first lamp assembly includes a first lamp support having a first end and a second end, the first lamp support includes the opening for receiving the protrusion of the first lamp attachment portion.

10. The vehicle front end assembly according to claim 9, wherein
the first lamp assembly further includes a first lamp housing, the first lamp support is a separate and distinct part from the first lamp housing, and the first lamp support is attached to the first lamp assembly with at least one first fastener.

11. The vehicle front end assembly according to claim 1, wherein
the first lamp assembly is attached to the first support at an inboard portion of the first lamp assembly.

12. A vehicle comprising the vehicle front end assembly according to claim 1, and further comprising
the front portion of a vehicle frame structure including a first upper panel and a second support attached to the first upper panel and the first lamp assembly.

13. The vehicle front end assembly according to claim 12, wherein
the vehicle attachment portion of the first support is attached to the first lamp support.

14. The vehicle front end assembly according to claim 12, further comprising:
a second lamp assembly is configured to be attached to the front portion of the vehicle frame structure,
the second lamp assembly including a headlamp.

15. The vehicle front end assembly according to claim 12, wherein
the first lamp assembly includes a turn signal lamp.

16. The vehicle front end assembly according to claim 1, wherein
the opening includes a slot having an upper edge extending in a lateral direction of the vehicle frame structure in the installed state, and
the protrusion is a flange having an upper surface contacting the upper edge of the slot.

17. The vehicle front end assembly according to claim 1, wherein
the first support is a bracket having the vehicle attachment portion configured to be directly attached to the front portion of the vehicle frame structure.

18. The vehicle front end assembly according to claim 17, further comprising
a fender configured to be directly attached to a side of the front portion of the vehicle frame structure, and
the front fascia being configured to be directly attached to the front portion of the vehicle frame structure.

19. The vehicle front end assembly according to claim 1, wherein
the rearwardly facing surface of the first lamp assembly has an inboard end and an outboard end, the opening in the rearwardly facing surface is spaced from the inboard end by a first distance, the opening in the rearwardly facing surface is spaced from the outboard end by a second distance, the first distance is less than the second distance.

20. A vehicle front end assembly comprising:
a front fascia configured to be attached to a front portion of a vehicle frame structure;
a first lamp assembly attached to the front fascia; and
a first support including a vehicle attachment portion configured to be attached to the front portion of the vehicle frame structure and a first lamp attachment portion attached to the first lamp assembly such that the first support supports the first lamp assembly to the front portion of the vehicle frame structure in an installed state where the vehicle front end assembly is attached to the front portion of the vehicle frame structure,
the vehicle attachment portion having an upright section extending perpendicularly from first lamp attachment portion, and
the first support further including a brace attached between the upright section of the vehicle attachment portion and the first lamp attachment portion.

21. A vehicle front end assembly comprising:
a front fascia configured to be attached to a front portion of a vehicle frame structure;
a first lamp assembly attached to the front fascia; and
a first support including a vehicle attachment portion configured to be attached to the front portion of the vehicle frame structure and a first lamp attachment portion attached to the first lamp assembly such that the first support supports the first lamp assembly to the front portion of the vehicle frame structure in an installed state where the vehicle front end assembly is attached to the front portion of the vehicle frame structure,
the vehicle attachment portion having an upright section having a first end and a second end, the first lamp attachment portion extends forwardly from the second end of the vehicle attachment portion.

22. The vehicle front end assembly according to claim 21, further comprising:
a second lamp assembly is configured to be attached to the front portion of the vehicle frame structure,
the first support further including a second lamp attachment portion extending forwardly from the first end of the upright section,
the second lamp assembly being attached to the second lamp attachment portion.

23. The vehicle front end assembly according to claim 22, further comprising
a third lamp assembly attached to the front fascia configured to be attached to the front portion of the vehicle frame structure;
a fourth lamp assembly configured to be attached to the front portion of the vehicle frame structure; and
an additional first support including an additional vehicle attachment portion configured to be attached to the front portion of a vehicle frame structure and an additional third lamp attachment portion attached to the third lamp assembly such that the additional first support supports the third lamp assembly to the front portion of a vehicle frame structure in a state where the vehicle front end assembly is attached to the front portion of a vehicle frame structure.

* * * * *